Patent Number: 4,464,714
Date of Patent: Aug. 7, 1984

[54] SYSTEM FOR TRANSMITTING DIGITAL INFORMATION, CODING ARRANGEMENT FOR USE IN THAT SYSTEM, DECODING ARRANGEMENT FOR USE IN THAT SYSTEM AND RECORD CARRIER FOR USE IN THAT SYSTEM

[75] Inventors: Arie Huijser; Marino G. Carasso; Johannes J. Verboom, all of Eindhoven, Netherlands

[73] Assignee: U.S. Philips Corporation, New York, N.Y.

[21] Appl. No.: 315,793

[22] Filed: Oct. 28, 1981

[30] Foreign Application Priority Data

Nov. 12, 1980 [NL] Netherlands ................. 8006165

[51] Int. Cl.³ .................. G06F 3/06; G11B 5/09; H03K 13/24
[52] U.S. Cl. ...................... 364/200; 360/40; 340/347 DD
[58] Field of Search ............. 360/39, 40, 42; 340/347 DD; 371/56; 364/200 MS File, 900 MS File

[56] References Cited

U.S. PATENT DOCUMENTS

| | | | |
|---|---|---|---|
| 4,150,404 | 4/1979 | Tercic et al. | 360/39 |
| 4,237,496 | 12/1980 | De Niet | 360/40 |
| 4,310,860 | 1/1982 | Leiner | 360/40 |
| 4,323,931 | 4/1982 | Jacoby | 360/40 |
| 4,330,799 | 5/1982 | Price | 360/40 |
| 4,337,457 | 6/1982 | Tache | 340/347 DD |
| 4,337,458 | 6/1982 | Cohn et al. | 340/347 DD |
| 4,346,367 | 11/1982 | Leinweber | 340/347 DD |
| 4,347,619 | 8/1982 | Dakin et al. | 375/37 |
| 4,367,495 | 1/1983 | Mita et al. | 360/39 |
| 4,369,472 | 1/1983 | Tanaka et al. | 360/40 |

Primary Examiner—Jerry Smith
Assistant Examiner—Mark P. Watson
Attorney, Agent, or Firm—Robert T. Mayer; Algy Tamoshunas

[57] ABSTRACT

A system for transmitting digital information including a coding arrangement, a transfer medium, for example a record carrier, and a decoding arrangement.

In the coding arrangement the digital information is received as groups of input words which are encoded to form code words, each code word corresponding to an input word. Each code word has a time duration equal to $s\tau_O$ and each is assembled from M subgroups $G_m$ of I signal positions $t_{mi}$ spaced by equal time intervals $\tau$, where m is a number from 1 to M, inclusive, corresponding to a subgroup $G_m$ and i is a number within each subgroup $G_m$ from 1 to I inclusive. In each subgroup $G_m$, k of these signal positions $t_{mi}$ are always occupied by a signal which is distinguishable from the signal in unoccupied positions, where k is an integer smaller than I ($1 \leq k \leq I-1$). The first positions of the subgroups $G_m$ are located at mutually different time intervals $\epsilon_m$ from the beginning of the code word, where $0 \leq \epsilon_m \leq \tau$ with the restrictions $M \geq 2$ and $$\sum_{m=1}^{M} \epsilon_m + (I-1)\tau \leq s\tau_O$$

and the group of code words for which it holds that M=2, I=s=2, k=1, $\tau=\tau_O$ and $\epsilon_2=\epsilon_1+\frac{1}{2}\tau$ being excepted.

36 Claims, 47 Drawing Figures $M=2$; $s=4$; $\tau=\tau_0$; $I=4$; $k=1$; $\epsilon_1=0$; $\epsilon_2=\frac{1}{2}\tau_0$;

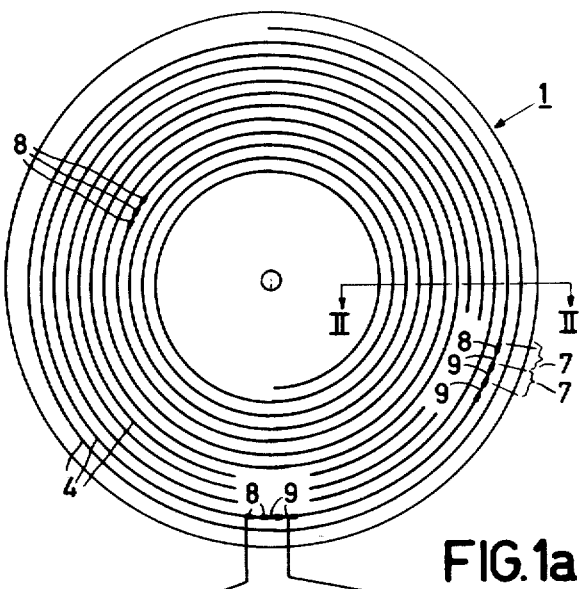
FIG.1a
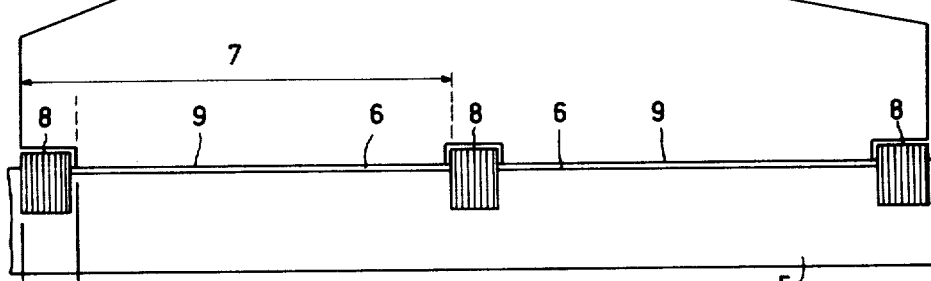
FIG.1b
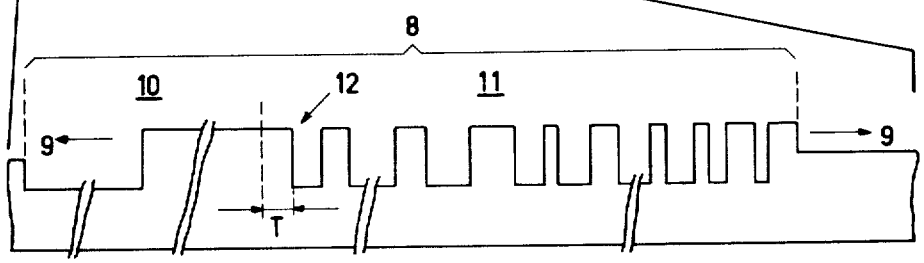
FIG.1c
FIG.2

$M=2$; $s=4$; $\tau=\tau_0$; $I=4$; $k=1$; $\varepsilon_1=0$; $\varepsilon_2=\frac{1}{2}\tau_0$;

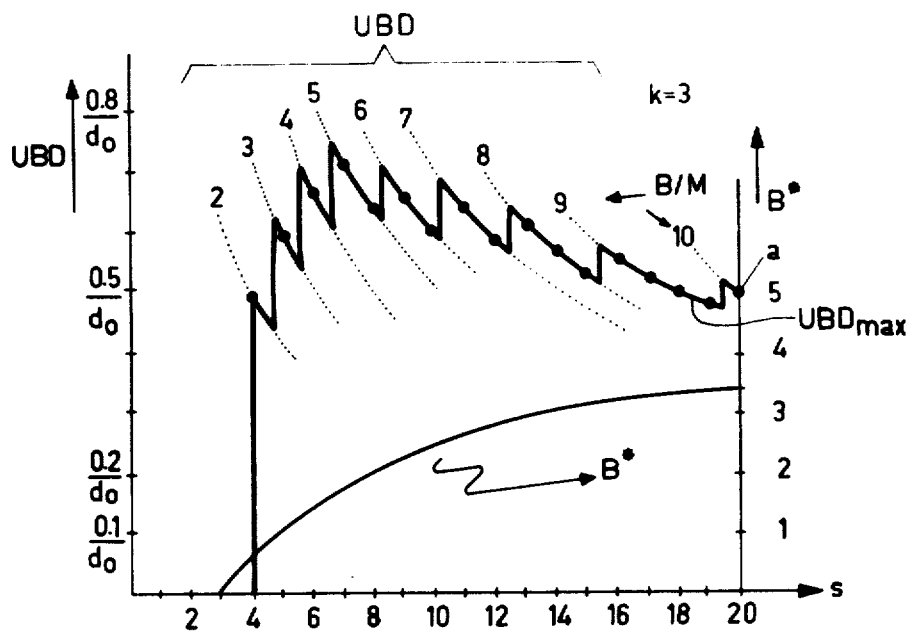
FIG.18
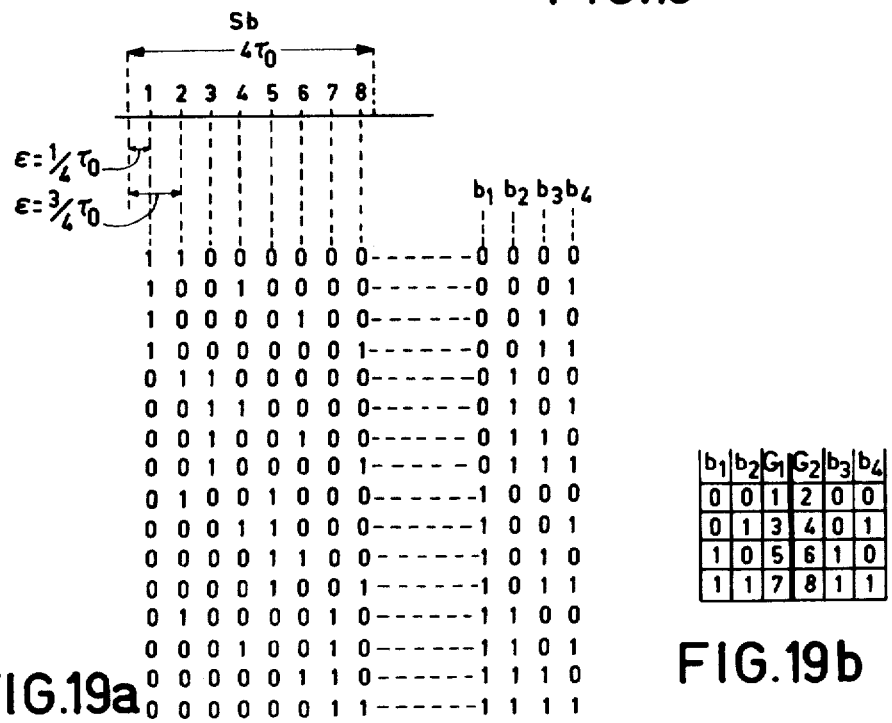
FIG.19a
FIG.19b

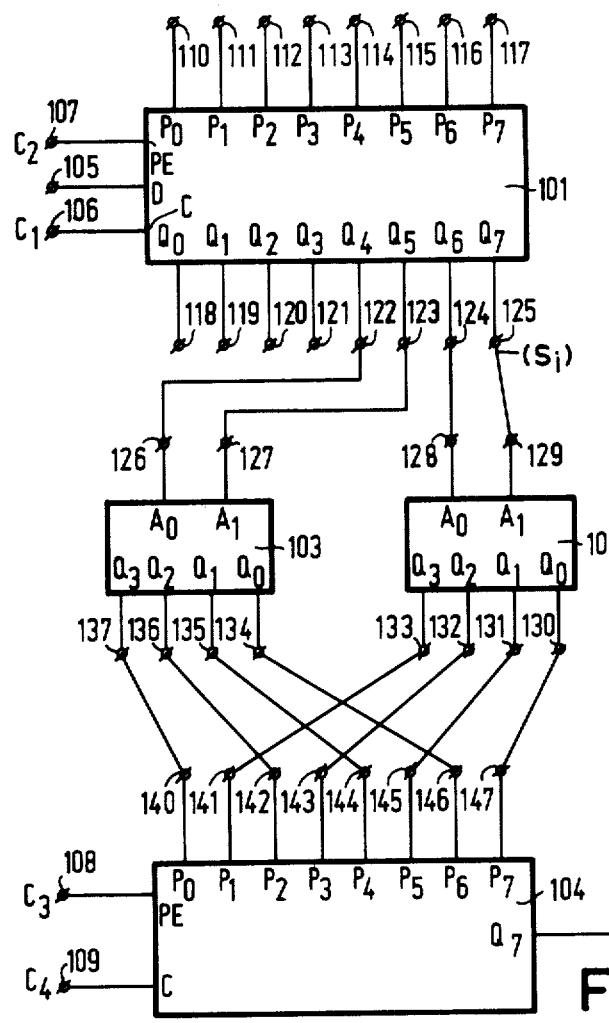
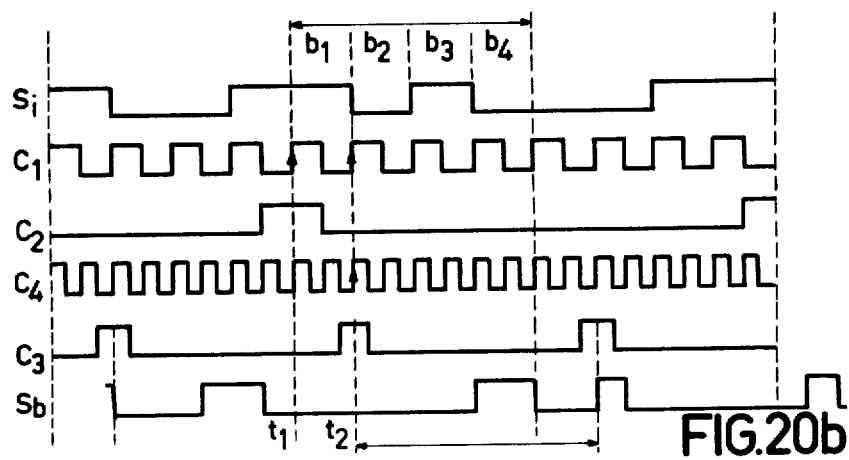

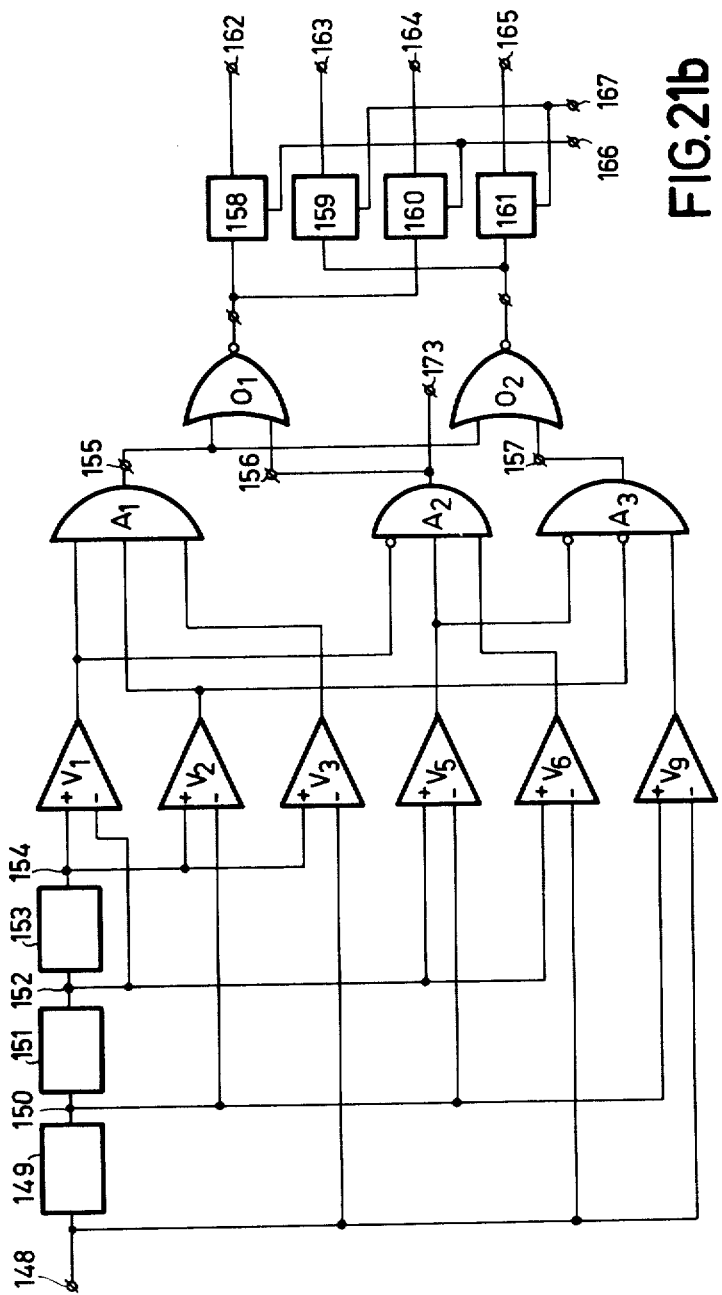

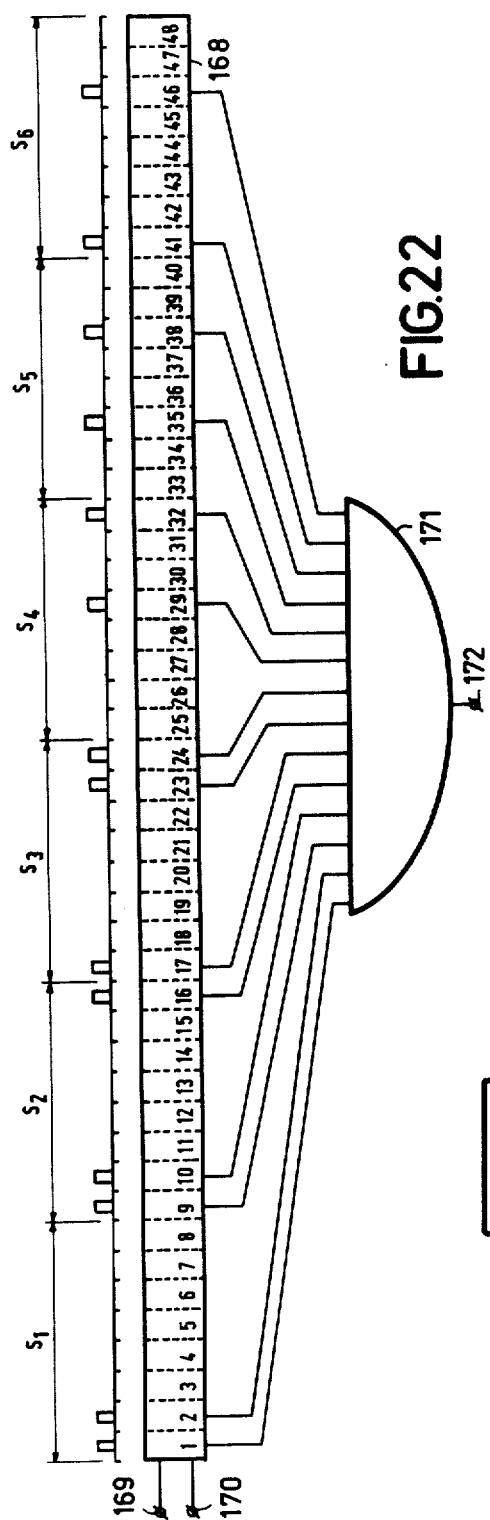

SYSTEM FOR TRANSMITTING DIGITAL INFORMATION, CODING ARRANGEMENT FOR USE IN THAT SYSTEM, DECODING ARRANGEMENT FOR USE IN THAT SYSTEM AND RECORD CARRIER FOR USE IN THAT SYSTEM

BACKGROUND OF THE INVENTION

The invention relates to a system for transmitting digital information comprising a coding arrangement, a transmitting medium such as a record carrier, and a decoding arrangement. In such a system the digital information is received in groups of input words which are converted, in the coding arrangements, into code words representing the input words. Each code word corresponds to an input word, and is arranged for application to the transmission medium, the code words being applied to the decoding arrangement via the transmission medium and then converted back into digital information in the decoding arrangement.

The invention also relates to a coding and decoding arrangement and a record carrier for use in such a system.

In several applications, for example in systems where the information is optically recorded on the medium and optically read therefrom, such as the system described in non-prepublished Netherlands Patent application No. 8000121, corresponding to U.S. application Ser. No. 124,392, filed Mar. 26, 1980, now abandoned, the description of which is included in the description of the FIGS. 1-13, a number of considerations are of importance for the selection of the group of code words. Thus, for low frequencies, the random power spectrum of the code words must preferably contain comparatively little signal power in order to allow the addition of low-frequency servo signals and at least the continuous portion of the power spectrum must have at least one zero point in order to allow the addition of a clock signal. In addition, a number of parameters must be optimized, such as the information density. In view of the power of the laser, in a system having an optical record carrier, the information density must be related to the number of bits to be burned into the record carrier with the laser.

From the many known coding systems it appears, as described in the above-mentioned application, that the "quadphase" coding is very suitable for use in such systems. Quadphase coding is described in an article by U. Appel and K. Trondle: "Zusammenstellung und Gruppierung verschiedener Codes fur die Ubertragung digitaler Signale", published in the Nachrichtentechnishe Zeitschrift, Vol. 1, 1970, pages 11-16, FIG. 7 in particular. A quadphase-coding signal is obtained by dividing the original binary data signal into groups of two bits, designated dibits, and by placing the first and the second bit, respectively, of the dibit in a first and a second half bit interval, respectively, of the coded word which consists of two bit intervals, and placing the inverted value of the first and the second bit, respectively, of the dibit in the third and fourth half bit interval, respectively, of the coded word.

SUMMARY OF THE INVENTION

The question has been asked whether this quadphase-coding is not part of a wider class of codings.

An object of the present invention is to provide a coding class whereby it is possible to choose the most optimum coding, depending on the desired use.

According to the present invention there is provided a system for the transmission of digital information, comprising a coding arrangement, a transfer medium, and a decoding arrangement. The digital information is received in groups of input words and is converted in the coding arrangement into code words representing the input words. Each code word corresponds to an input word and is applied to the transfer medium. The code words are then applied to the decoding arrangement via the transmission medium and therein converted into digital information. The code words belong to a group of code words, each code word having a length of time equal to $s\tau_0$ and each comprised of M subgroups $G_m$ of I signal positions $t_{mi}$ spaced at equal time intervals $\tau$, wherein m is a number from 1 to M, inclusive corresponding to a subgroup $G_m$ and i is a number within each subgroup $G_m$ from 1 to I inclusive. A number K of those signal positions $t_{mi}$ in each subgroup $G_m$ are always occupied by a signal which is distinguishable from the signal in unoccupied positions, where k is an integer smaller than I ($1 \leq k \leq I-1$). The first positions, $t_{m1}$, of the subgroups $G_m$ are located at mutually different time intervals $\epsilon_m$ from the beginning of the code word, where $0 \leq \epsilon_m \leq \tau$, with the restrictions $M \geq 2$ and $$\sum_{m=1}^{M} \epsilon_m + (I-1)\tau \leq s\tau_0$$

and the group of code words for which it holds that: $M=2$, $I=s=2$, $k=1$, $\tau=\tau_0$ and $\epsilon_2=\epsilon_1+\frac{1}{2}\tau$ excepted.

The quadphase coding, which is known per se is part of the excepted group of code words having parameters $M=2$, $I-s=2$, $k=1$, $\tau=\tau_0$ and $\epsilon_2=\epsilon_1+\frac{1}{2}\tau$.

The system in accordance with the invention may further be characterized in that it holds that $I=s$ and $\tau=\tau_0$. Hence, it holds that the word length $s\tau_0$ is equal to the number of positions I multipled by the time interval $\tau$ between those positions.

As regards the clock signal generation, the invention may further be characterized in that the initial positions $t_{mi}$ are located equidistantly at time intervals $\epsilon_m = \epsilon_1 + m - 1/M \cdot \tau$ from the beginning of the code word.

This condition being satisfied, no direct function occurs in the first zero point of the power spectrum at the angular frequency $\omega_0 = 2\pi/\tau$ so that a clock signal can be added. The system in accordance with the invention may then be further characterized in that the code words are transmitted via the medium together with an added pilot signal having angular frequency $\omega_0 = 2\pi/\tau$. The pilot signal is filtered out in the decoding arrangement and serves as a clock signal.

An alternative embodiment of the system in accordance with the invention may further be characterized in that the initial positions $t_{m1}$ are located equidistantly at time intervals $\epsilon_m = \epsilon_1 + m - 1/m + \delta\,\tau$ from the beginning of the code word and that in the decoding arrangement a clock signal is recovered from the coded signal by means of a band-pass filter tuned to the angular frequency $\omega_0 = 2\pi/\tau$. With this system a dirac peak occurs in the zero point $\omega_0 = 2\pi/\tau$ of the spectrum, which dirac peak can be used as a co-transmitted clock signal.

An embodiment of the system in accordance with the invention which is suitable for optical recording may be characterized in that for the group of code words it holds that: $I=s=4$, $M=2$, $\tau=\tau_0$, $k=1$ and $\epsilon_2=\epsilon_1+\frac{1}{2}\tau_0$.

As regards coding, the system in accordance with the invention may further be characterized in that the input words are divided into M groups of bits which are each coded in the coding arrangement into a subgroup $G_m$ by means of a k-out-of-I coding circuit, whereafter the M subgroups are combined to form a code word by means of superposition.

This system may further be characterized in that the digital information is received in input words of four bits and that it is divided into two groups of two bits each, which are each applied to a one-out-of-four decoding arrangement. The four outputs of each of the two decoding circuits are alternately combined to transmit the code words associated with the input words and the outputs of the two decoding circuits are alternately connected to parallel inputs of a shift register to thus form the code word from both subgroups.

As regards decoding, the system in accordance with the invention may further be characterized in that the decoding arrangement comprises a sequence of I-1 delay networks having a time delay $\tau$, whose inputs and output lead to a comparison circuit to thus detect sequentially, over time intervals $\epsilon_m$, the occupied positions $t_{mi}$ of each time one subgroup $G_m$ and further in that sequentially per subgroup $G_m$ a plurality of bits of the output word are formed whereafter these bits are transmitted serially and/or in parallel.

As regards the medium, the system in accordance with the invention may further be characterized in that the medium is a record carrier divided into information areas where information can be recorded or has been recorded in the form of code words. The information areas are separated by address and synchronization areas in which address and synchronization information has been previously recorded in the form of code words as described above.

In order to obtain word synchronization signals the last-mentioned system may further be characterized in that the address and synchronization information is recorded in the form of code words having predetermined values of the parameters I, s, M, $\tau$, $\tau_0$, k and $\epsilon_m$. So as to enable identification of the synchronization information, at least two code words are provided with a different number of occupied positions such that, individually or in combination, these code words again form code words as described above with a different value of at least one of the parameters I, s or k.

In a further embodiment of a system in accordance with the invention, the address and synchronization information is recorded in the form of code words from a group having the parameters $I=s=4$, $M=2$, $\tau=\tau_0$, $k=1$ and $\epsilon_2=\epsilon_1+\frac{1}{2}\tau_0$. In at least two code words of the synchronization information, an extra position is occupied such that both code words together form a code word from a group having the parameters $I=s=8$, $M=2$, $\tau=\tau_0$, $k=3$ and $\epsilon_2=\epsilon_1+\frac{1}{2}\tau_0$.

A coding arrangement for use in a system in accordance with the invention comprises inputs for receiving digital information grouped into input words, a code word generator for generating code words, each corresponding to an input word. The code words belong to a group of code words each having a time duration equal to $s \tau_0$ and each being assembled from M subgroups $G_m$ of I signal positions $t_{mi}$ which are spaced by equal time intervals $\tau$, wherein m is a number from 1 to M, inclusive, corresponding to subgroup G and i is a number within each subgroup $G_m$ from 1 to I, inclusive. A number k of these signal positions $t_{mi}$ in each subgroup $G_m$ are always occupied by a signal which is distinguishable from the signal in unoccupied positions, wherein k is an integer smaller than I ($1 \leq k \leq I-1$). The first positions $t_{m1}$ of the subgroups $G_m$ are located at mutual different time intervals $\epsilon_m$ from the beginning of the code word, wherein $0 \leq \epsilon_m \leq \tau$, with the restrictions $M \geq 2$ and $$\sum_{m=1}^{M} \epsilon_m + (I-1)\tau \leq s\tau_0,$$

and the group of code words for which it holds that: $M=2$, $I=s=2$, $k=1$, $\tau=\tau_0$ and $\epsilon_2=\epsilon_1+\frac{1}{2}\tau$ excepted.

This coding arrangement may have as further characteristics in that: $I=s$ and $\tau=\tau_0$, that the coding arrangement is arranged such that the initial positions $t_{mi}$ are located at time intervals $\epsilon_m=\epsilon_1+m-1/M \tau$ from the beginning of the code word, and that the coding arrangement is arranged such that the initial positions $t_{m1}$ are located at time intervals $\epsilon_m=\epsilon_1+m-1/M+\delta\ \tau$ from the beginning of the code word.

An embodiment of the coding arrangement is characterized in that the coding arrangement is arranged such that it holds that: $I=s=4$, $M=2$, $\tau=\tau_0$, $k=1$ and $\epsilon_2=\epsilon_1+\frac{1}{2}\tau_0$, and may be further characterized in that the inputs are arranged for receiving inputs words of n. M bits, wherein $n \geq 1$ and is an integer. The coding arrangement includes means for dividing those input words into M groups of n bits, M decoding circuits for generating one subgroup $G_m$ for each group of n bits and means for superpositioning the M subgroups $G_m$. For the case where $n=2$, $M=2$ and $k=1$, the decoding circuits are one-out-of-four decoders, each having four outputs each input of which carries a different signal depending on which of the four possible combinations of two bits is present at the input of that decoder. The outputs of both one-out-of-four decoders are alternately combined to form the code word associated with the input words, and the outputs of both one-out-of-four decoders are alternately connected to parallel inputs of a shift register to thus form the code word from both subgroups.

A decoding arrangement for use in a system in accordance with the invention may be characterized in that the decoding arrangement has an input for receiving code words and an output for supplying digital information by decoding those code words. The decoding arrangement is arranged for decoding code words belonging to a group of code words, each having a time duration equal to $s\tau_0$ and each assembled from M subgroups $G_m$ of I signal positions $t_{mi}$ which are located at equal time intervals $\tau$, wherein m is a number from 1 to M, inclusive corresponding with subgroup $G_m$ and i is a number within each subgroup $G_m$ from 1 to I, inclusive. A number k of these signal positions $t_{mi}$ in each subgroup $G_m$ is always occupied by a signal which is distinguishable from the signal in unoccupied positions, wherein k is an integer smaller than I ($1 \leq k \leq I-1$). The first positions $t_{mi}$ of the subgroups $G_{mi}$ are located at mutually different time intervals $\epsilon_m$ from the beginning of the code word, where $0 \leq \epsilon_m \leq \tau$ with the restrictions $M \geq 2$ and $$\sum_{m=1}^{M} \epsilon_m + (I - 1)\tau \leqq s\tau_0,$$

and the group of code words for which it holds that: $M=2$, $I=s=2$, $k=1$, $\tau=\tau_0$ and $\epsilon_2=\epsilon_1+\frac{1}{2}\tau$ excepted.

This coding arrangement may further be characterized in that it holds that: $I=s$ and $\tau=\tau_0$, that the coding arrangement is arranged such that the initial positions $t_{m1}$ are located at time intervals $\epsilon_m=\epsilon_1+m-1/M \ \tau$ from the beginning of the code word, and that the coding arrangement is arranged such that the initial positions $t_{m1}$ are located equidistantly at time intervals $\epsilon_m=\epsilon_1+m-1/M+\delta \ \tau$ from the beginning of the code word.

An embodiment of the coding arrangement is characterized in that: $I=s=4$, $M=2$, $\tau=\tau_0$, $k=1$ and $\epsilon_2=\epsilon_1+\frac{1}{2}\tau_0$, and has a further characteristic in that the inputs are arranged for receiving input words of n.M bits, wherein $n\geqq 1$ and is an integer. The coding arrangement includes means for dividing those input words into M groups of n bits, M decoding circuits for generating one subgroup $G_m$ for each group of n bits and means for the superposition of the M subgroups $G_m$. For the case where $n=2$, $M=2$ and $k=1$, the decoding circuits may be one-out-of-four decoders each having four outputs, one output of which carries each time a different signal depending on which one of the four possible combinations of two bits is present at the input of that decoder. The outputs of both one-out-of-four decoders are alternately combined to form the code word associated with the input word, and the outputs of both one-out-of-four decoders are alternately connected to parallel inputs of a shift register to form thus the code word from both subgroups.

A decoding arrangement for use in a system in accordance with the invention is characterized in that it has an input for receiving code words and an output for supplying digital information by decoding those code words. The decoding arrangement is arranged for decoding code words, each having a time duration equal to $s\tau_0$ and each being assembled from M subgroups $G_m$ of I signal positons $t_{ml}$ which are spaced by equal time intervals $\tau$, wherein m is a number from 1 to M, inclusive corresponding with subgroup $G_m$ and i is a number within each subgroup $G_m$ from 1 to I, inclusive. In each subgroup $G_m$, k positions of these signal positions $t_{mi}$ are always occupied by a signal which is distinguishable from the signal in unoccupied positions, wherein k is an integer smaller than I ($1\leqq k\leqq I-1$). The first positions $t_{m1}$ of the subgroups $G_m$ are located at mutually different time intervals $\epsilon_m$ from the beginning of the code word, wherein $0\leqq E_m\leqq \tau$, with the restrictions $M\leqq 2$ and $\epsilon_m+(I-1)\tau\leqq s\tau_0$ and the group of code words for which it holds that: $M=2$, $I=s=2$, $k=1$, $\tau=\tau_0$ and $\epsilon_1+\frac{1}{2}\tau$ excepted.

One embodiment of the decoding arrangement is characterized in that it comprises a sequence of $I-1$ delay networks having a time delay whose inputs and outputs lead to a comparison circuit to detect thus sequentially over time intervals $_m$ the occupied positions $t_{mi}$ of each time one subgroup $G_m$. The comparison circuit comprises a plurality of comparators each having an inverting and a non-inverting input and each comparator compares the signals on a different pair of all possible pairs of points, which are formed by the inputs of the $I-1$ delay networks and the output of the last delay network with each other. First logic gates are provided for comparing output signals of the comparators, the outputs of each of these first logic gates being associated with an occupied positon $t_{mi}$ of a subgroup $G_m$ so that the outputs of those logic gates sequentially produce the subgroups $G_m$. Second logic gates are provided for generating the digital information associated with the code words. This decoding arrangement may also include a band filter which is tuned to an angular frequency $w_0=2\pi/\tau$ for filtering a clock signal from the signal formed by the code words.

As regards the recovery of a word synchronization signal, the decoding circuit may be provided with a third gate circuit which is tuned to a sequence of predetermined code words in order to generate a word synchronization signal. The third gate circuit is connected to the output of one of the first logic gates.

A record carrier for use as a medium in a system of the invention is characterized in that it comprises a recorded signal which consists of the sequence of code words which belong to a group of code words each having a time duration equal to $s\tau_0$ and each being assembled from M subgroups $G_m$ of I signal positions $t_{mi}$ which are spaced by equal time intervals, wherein m is a number from 1 to M, inclusive corresponding to a subgroup $G_m$ and i is a number within each subgroup $G_m$ from 1 to I, inclusive. A number k of these signal positions $t_{mi}$ in each subgroup $G_m$ is always occupied by a signal which is distinguishable from the signal in unoccupied positions, wherein k is an integer smaller than I ($1\leqq k\leqq I-1$). The first positions $t_{m1}$ of the subgroups $G_m$ is located at mutually different time intervals $\epsilon_m$ from the beginning of the code word, wherein $0\leqq\epsilon_m\leqq\tau$, with the restrictions $M\geqq 2$ and $\epsilon_m+(I-1)\tau\leqq s\tau_0$, and the group of code words for which it holds that: $M=2$, $I=s=2$, $k=1$, $\tau=\tau_0$ and $\epsilon_2=\epsilon_1+\frac{1}{2}\tau$ excepted.

A record carrier for use as a medium in a system in accordance with the invention may also be characterized in that the record carrier is divided into information areas where information can be recorded or has been recorded in the form of code words, the information areas being separated by address and synchronization areas in which address and synchronization information has been previously applied in the form of code words such as those described above. Further characteristics of the record carrier may be that $I=s$ and $\tau=\tau_0$, that the initial positions $t_{m1}$ are located equidistantly at time intervals $\epsilon_m=\epsilon_1+m-1/M \ \tau$ from the beginning of the code word, that a pilot signal having angular frequency $\omega_0=2\pi/\tau$ is added to the code words, that the initial positions $t_{m1}$ are located equidistantly at time intervals $\epsilon_m=\epsilon_1+m-1/M+\delta \ \tau$ from the beginning of each code word and that it holds for the group of code words that: $I=s=4$, $M=2$, $\tau=\tau_0$, $k=1$ and $\epsilon_2=\epsilon_1+\frac{1}{2}\tau_0$.

In order to generate word synchronization signals, the address and synchronization information may be recorded in the form of code words having predetermined values for the parameters I, s, M, $\tau$, $\tau_0$, k and $\epsilon_m$ and in order to identify the synchronization information, at least two code words have a different number of occupied positions such that these code words form, individually or in combination, code words as described above having a different value for at least one of the parameters I, s or K. The address and synchronization information is recorded in the form of code words from a group having parameters $I=s=4$, $M=2$, $\tau=\tau_0$, $k=1$ and $\epsilon_2 = \epsilon_1 + \frac{1}{2}\tau_0$ and in at least two code words of the synchronization information, an additional position is occupied such that both code words together form a code word from a group having parameters $I = s = 8$, $M = 2$, $\tau = \tau_0$, $k = 3$ and $\epsilon_2 = \epsilon_1 + \frac{1}{2}\tau_0$.

BRIEF DESCRIPTION OF THE DRAWINGS

The invention will now be further described by way of non-limitative example, with reference to the accompanying drawings, in which:

FIG. 1 shows a possible embodiment of a record carrier to which the principle of the invention may be applied, FIG. 1a being a plan view of the record carrier, FIG. 1b showing on an enlarged scale a part of a track 4 of that record carrier, and FIG. 1c showing on an enlarged scale a synchronization area of that part.

FIG. 2 shows a small part of the cross-section taken along the line II—II not marked in FIG. 1a.

FIG. 18 is a diagram in accordance with FIG. 16 with parameter $k = 3$, FIGS. 19a and 19b are Tables illustrating a code which is particularly suited to the transmission system in accordance with the invention, FIG. 20a shows an embodiment of a coding arrangement for use in a transmission system in accordance with the invention and FIG. 20b shows a diagram to explain the operation of that coding arrangement, FIG. 21b shows an embodiment of a decoding arrangement for use in a transmission system in accordance with the invention, and FIG. 21a is a diagram for explaining the operation of the decoding arrangement of FIG. 21b, FIG. 22 shows a word synchronizing signal generator for use in combination with the decoding arrangement in accordance with FIG. 21b, and FIG. 23 is a block schematic circuit diagram of a transmission system in accordance with the invention in which the operative relationships of the arrangements of FIGS. 20a, 21b and 22 in a system in accordance with the invention for optical recording is shown.

DESCRIPTION OF THE PREFERRED EMBODIMENTS

Figure 3:
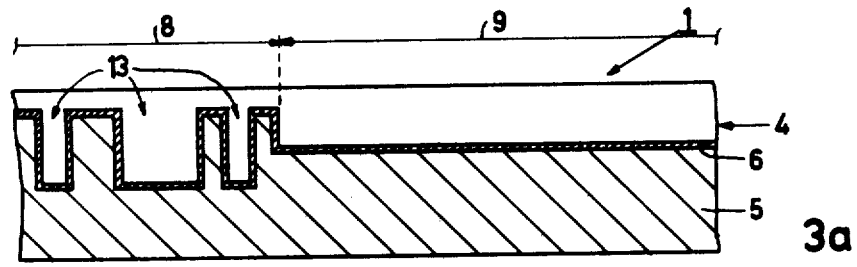
FIG. 3 shows in FIGS. 3a to 3d a schematic cross-section in the longitudinal direction through a part of the track 4, FIG. 3a showing such a cross-section for a blank disc prepared in accordance with a known technology, FIG. 3b showing the cross-section of FIG. 3a after information has been recorded in the information area 9, FIG. 3c showing such a cross-section of a blank disc prepared in accordance with the above-mentioned prior application and FIG. 3d showing the cross-section of FIG. 3c after digital information has been recorded, and FIG. 3e schematically representing the signal obtained when reading the part of the track 4 shown in cross-section in FIG. 3d, and FIG. 3f showing schematically a plan view of a part of track 4 after digital information has been recorded in a different manner than shown in FIGS. 3b and 3d.
Figure 3:
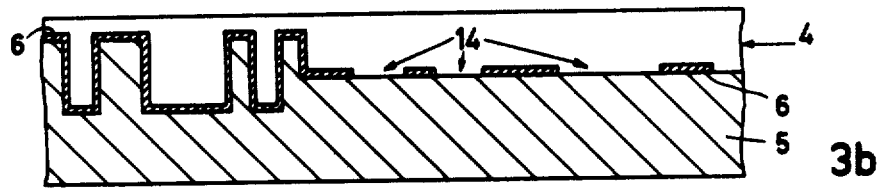
Figure 3:
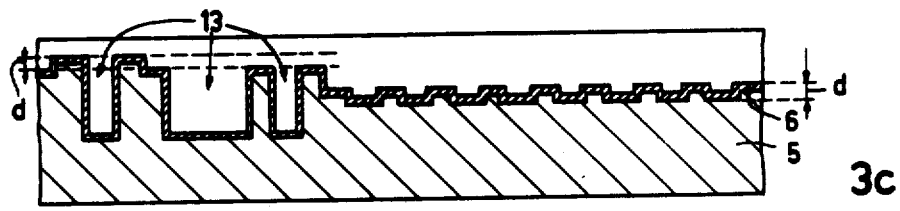
Figure 3:
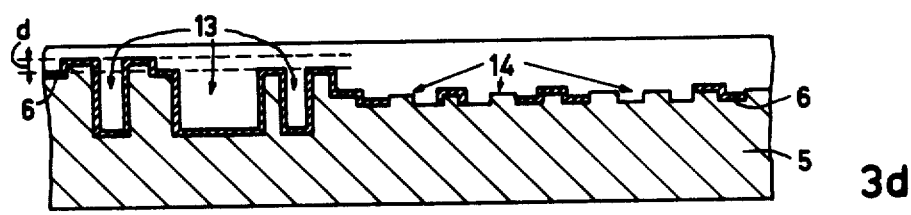
Figure 3:
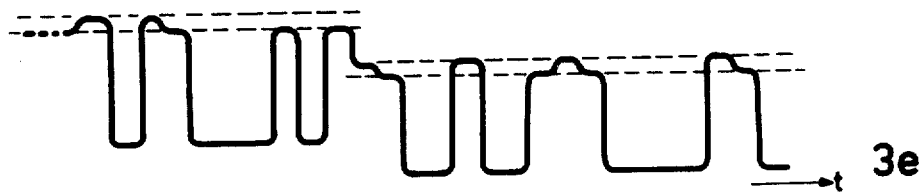
Figure 3:
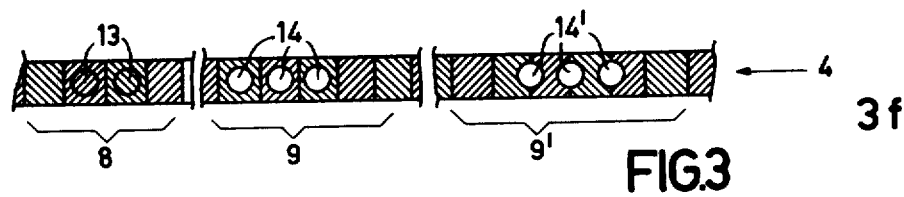

To explain the system for which the coding method of the invention is primarily intended there now follows, with reference to FIGS. 1-13, the description of an optical recording system such as that described in said Netherlands Patent application No. 8000121 corresponding to U.S. application Ser. No. 134,392.

As shown in FIG. 1a the record carrier body 1 is provided with a spiral track 4, which is divided into a plurality of sectors 7, for example 128 per revolution. Each sector 7 comprises an information area 9, intended for recording digitally coded information, and a synchronization area 8.

In order to ensure that the digital information is recorded in an accurately defined path, the track is employed as servo track. For this purpose the information areas 9 of the sectors 7 exhibit an amplitude structure, as is shown in FIG. 2. FIG. 2 shows a small part of the cross-section taken on the line II—II in FIG. 1a and thus shows a number of adjacent track portions, specifically information areas, of the servo track 4. The direction of the servo tracks 4 is thus perpendicular to the plane of the drawing. These servo tracks 4, in particular the information areas 9, thus take the form of grooves in the substrate 5. This makes it possible to control a radiation beam, which is directed at the record carrier in order to record information, to coincide accurately with this servo track 4. In other words to control the position of the radiation beam in a radial direction via a servo system which employs light reflected by the record carrier. The measurement of the radial position of the radiation spot on the record carrier may be in accordance with systems similar to those used with optical record carriers provided with a video signal as described in, inter alia, "I.E.E.E. Transactions on consumer electronics", November 1976, page 307.

For the recording of digital information, the record carrier body is provided with a thin layer of a material 6 which, if exposed to suitable radiation, is subject to an optically detectable change. In principle, only the information portions 9 of the sectors need be provided with such a layer. However, for reasons of manufacturing technology it is simpler to provide the entire record carrier surface with such a thin layer. This layer 6 may, for example, comprise a thin layer of a metal such as tellurium. This metal layer can be melted locally by laser radiation of sufficient high intensity, so that locally this information layer 6 is given a different reflection coefficient. When an information track thus inscribed is scanned by a read beam the reflected radiation beam is amplitude-modulated in accordance with the recorded information.

Alternatively, the layer 6 may take the form of a double layer of materials, for example aluminum on iron, which react chemically to incident radiation. At the location where a high-power radiation beam is incident on the disc, $FeAl_6$ is formed, which is a poor reflector. A similar effect is obtained in the case of a double layer of bismuth or tellurium, $Bi_2Te_3$ being formed. A single layer of tellurium may alternatively be used.

Since, with the aid of the servo track in the form of a groove in the substrate 5 the write radiation spot is made to coincide accurately with this servo track, in particular when an information area is being scanned, the digital information modulating the write beam is recorded exactly in the information area coinciding with this servo track.

As is apparent from the foregoing, the record carriers intended for the user, whose information areas do not yet contain information, have a groove structure in these information areas within the sectors. In addition, within each sector such a record carrier has a synchronization area 8 in the form of an optically detectable relief structure. FIG. 1b, on an enlarged scale, shows a part of a track 4, from which the sequence of a number of information areas 9 and synchronization areas 8 is apparent. In this case the synchronization areas 8 have a relief structure constituted by a sequence of recesses alternating with intermediate areas. The depth of the recesses in this structure of the synchronization area is greater than the depth of the servo track in the information area 9. This depth of the recesses is selected in accordance with general optical rules an in dependence on the shape of said recesses in the selected read system, such that an optimum readout of the information represented by the structure is obtained. In the case of a read system in which the radiation beam reflected by the record carrier is detected by a single photodetector $\frac{1}{4}\lambda$ may be selected as depth for the recesses, $\lambda$ being the wavelength of the radiation used. If the depth of the servo track in the information area 9 is selected to be $\frac{1}{8}\lambda$ or less, this servo track will have little affect on the amount of light detected by the detector.

In order to further illustrate the structure of the synchronization area, FIG. 1c shows such a synchronization area on a more enlarged scale, the information layer 6 being omitted for the sake of simplicity. Such a synchronization area 8 has two portions, namely an indication portion 10 and an address portion 11. The address portion 11 contains all the information required for controlling the recording process. When recording digital information, this information is converted into a so-called word-organized bit series. This address portion contains information about the word organization, so that during recording the location of the bit words is defined and during reading the bit words are suitably decoded. Furthermore, the address portion 11 contains information which identifies the track number of the track circumference in which the corresponding track portion is located. This information takes the form of a relief structure in accordance with a digital modulation technique suitable for the recording medium. Since, in addition to the servo track in the form of a groove in the information portions 9, the record carrier contains in these synchronization areas all the information required for positioning information in the form of a bit-word-organized bit series in said information areas, the requirements imposed on the write and read apparatus employed by the user may be less stringent. Furthermore, since this fully prerecorded information is formed in the record carrier as a relief structure, said record carrier is particularly suitable for mass-production using the customary pressing technique.

FIGS. 3a to 3d inclusive, schematically show a part of such a servo track 4 in a cross-section in the longitudinal direction of said servo track 4 with a part of the synchronization area 8 and a part of the information area 9.

The prepared disc is provided with the servo groove 4 which is formed in a substrate 5, for example by means of a laser beam. By modulating the intensity of the laser beam it is then possible to form a relief structure of "pits" 13 containing information in the synchronization area 8. Subsequently, the entire disc, including for the sake of simplicity, the portion of the record carrier 1 outside the groove 4 may then be coated with the reflecting information layer 6. In the record carrier thus prepared information can be recorded in the information area 9 by forming holes 14 in the reflecting information layer 6, for example by means of a laser beam. Such an inscribed record carrier is shown in FIG. 3b. When information is written, i.e. the holes 14 are formed, and when the information is read, for example by means of a laser beam, it is of importance that this information writing or reading process is synchronized with the aid of a clock signal, which may be derived from synchronization area 8. In order to ensure that during writing and reading a suitable synchronous clock signal is available continuously, i.e. during writing or reading in the information areas 9 as well, the servo groove 4 is provided with a structure which produces a modulation of the light reflected by the information carrier when the servo track 4 is followed during reading or writing.

Figure 4:
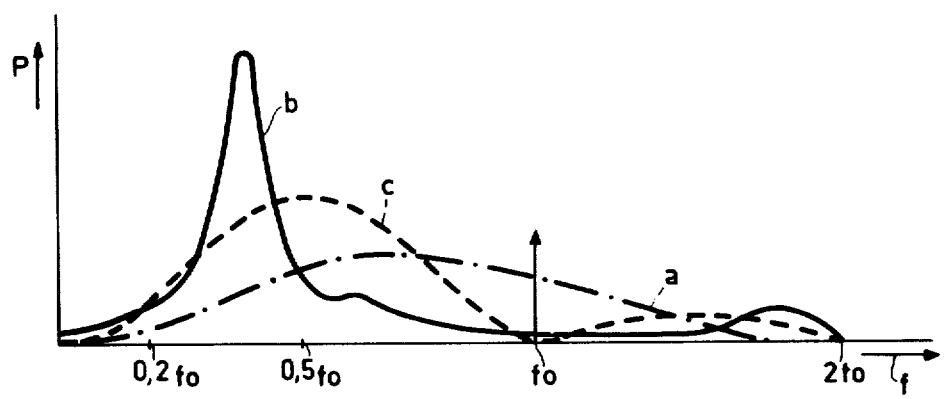
FIG. 4 shows random power spectra of three digital information signal modulations.

However, this structure should be such that it does not disturb the read-out of information. That this is possible is explained with reference to FIGS. 4 and 5, FIG. 4 representing the random power spectra of three possible binary information signal modulations and FIG. 5 being a diagrammatic representation of said modulation.

Figure 5:
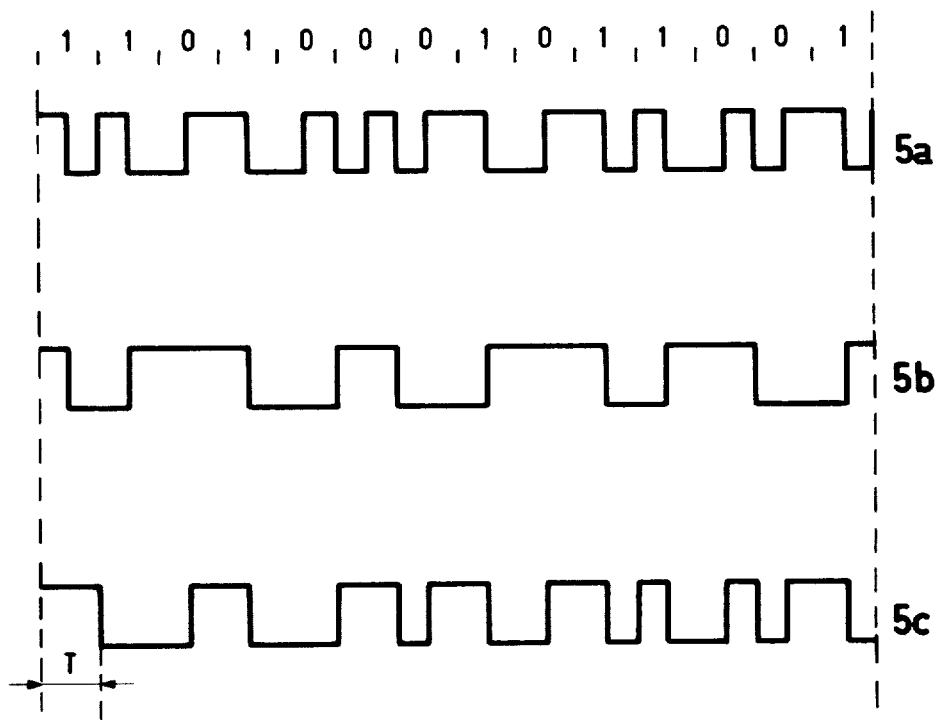
FIG. 5 is a diagrammatic representation of those modulations, FIG. 6 in FIG. 6a schematically represents an apparatus for producing a record carrier as shown in FIG. 3c, FIG. 6b schematically represents an apparatus for inscribing information in the record carrier shown in FIG. 3c, and FIG. 6c an apparatus for reading an inscribed record carrier.

The reference a in FIG. 5 designates modulation known as "biphase" modulation, in which the applied digital signal is converted into a binary signal which for a logic "one" of the applied digital signals is positive during the time interval T/2 and negative during the next time interval T/2, T being the bit length of the applied digital signal. A logic "zero" yields exactly the opposite binary signal, i.e. negative for the time interval T/2 and positive for the next time interval T/2. This modulation technique yields a binary signal which has a frequency spectrum of the energy distribution represented by a in FIG. 4. The frequency fo then corresponds to 1/T.

The reference b in FIG. 5 represents the modulation known by the name of "Miller" modulation. The binary signal generated by means of this modulation has a transition halfway a logic "one" of the applied digital signal and at the junction of two consecutive logic "zeroes". The frequency spectrum of the binary signal obtained by means of this modulation tecnique has the designation b in FIG. 4.

Finally, the reference c in FIG. 5 represents a modulation known as "quadphase" modulation. In this scheme, the applied bit series of the digital signal are first divided into consecutive groups of two bits. From each two-bit group having a duration of 2T, a binary signal is derived which in a first time interval T has the same sequence of bits as the original two bits in the group and in the next time interval T repeats the sequence inverted in sign. The bit combinations 11, 00, 01 and 10, respectively are thus converted into the bit combinations 1100, 0011, 0110 and 1001, respectively. The binary signal obtained by means of this modulation technique has a frequency spectrum designated by c in FIG. 4.

It is evident from FIG. 4 that these modulation techniques have the common property that the resulting binary signal exhibits no strong frequency components at comparatively low frequencies, for example frequencies below 0.2 fo. This is very useful when an optical record carrier is used with the associated write and read systems. As stated previously, such systems employ both a servo control to keep the scanning spot accurately focused on the record carrier and a servo control which controls the radial position of the scanning spot so as to ensure that the scanning spot accurately coincides with the information track. Since the control signals required for these servo controls are derived from the radiation beam which is reflected by the record carrier, which is also modulated by the relief structure of the synchronization area, it is essential that the frequency spectrum of the binary signal stored in the address portion does not contain any strong frequency components within the frequency band intended for the control signals. FIG. 4 thus shows that the frequency band below approximately 0.2 fo is suitable for such control signals. The control signals for the servo systems may for example extend to a maximum frequency value of 15 kHz. If the frequency fo 1/T is, for example, selected to be 500 kHz, it will be evident from FIG. 5 that the binary signals a, b or c exhibit only very weak frequency components at the frequency of 15 kHz and lower.

From FIG. 4 it is furthermore apparent that at the frequency 2fo and in the case of modulation method c the spectrum also has zero points at frequency fo. Thus, it is possible to provide the record carrier with a clock structure of the frequency 2fo without interference with the information signal. Zero points at the frequency 2fo also occur in the case of other modulation methods.

When quadphase modulation (modulation c) is used and also in the case of some other modulation methods, the frequency fo is highly suitable for a clock frequency, said frequency corresponding to the bit frequency 1/T, so that this quadphase modulation becomes very attractive. Also in the case of modulation method b a structure with the frequency fo may be used in some cases because the components of the spectrum are comparatively small at said frequency. In addition, it is theoretically possible to give the structure a modulation corresponding to a frequency higher than 2fo, but in practice this is generally not feasible. Indeed, in order to obtain a maximum information density, the dimensions of the pits 13 and 14 (FIG. 3f), which at a specitif speed of rotation of the disc 1 at least correspond to a bit length of 1/2T, are selected near the limit of resolution of the write/read system used, so that a surface structure corresponding to frequencies higher than 2fo will hardly be detectable. By means of special modulation techniques it is also possible to obtain zero points in power spectra at frequencies other than fo or 2fo, for example at ½fo.

FIG. 3c is a cross-sectional view of a record carrier in accordance with the prior application corresponding to the cross-section shown in FIG. 3a, whose surface at least at the location of the track 4 has been provided with a relief structure having a height d. A possible way of realizing this structure is to modulate the laser which is used to form the synchronization area 8 and the groove 4 of information area 9. In the present example this has only been done in the synchronization area 8 between the pits 13 by limiting the intensity of the laser beam. However, in principle it is also possible to provide the bottoms of the pits with a relief structure. As is shown in FIG. 3d the disc can also have information written into it by forming holes 14 in the reflecting layer 6 covering the relief structure. FIG. 3e shows an example of a signal obtained when reading a relief structure in accordance with FIG. 3d. This signal exhibits minima at the location of the pits 13 or the holes 14 and an amplitude modulation corresponding to the relief structure (d in FIG. 3c) having the frequencies fo at the maxima. The modulation structure of the bottoms of the holes 14 hardly contributes to the signal because it hardly reflects any light owing to the removal of the reflecting layer 6. In this respect it is to be noted that it is, for example, also possible to provide a non-reflecting layer 6 on a reflecting substrate 5, which layer is locally removed. As a result of this the modulation of the frequency fo will be read satisfactorily at those locations 14 where the non-reflecting layer has been removed.

In FIGS. 3a to 3d the pits 13 or the holes 14 are shown as continuous holes or pits, i.e. in the case of more than one bit, as an elongate slot having a length corresponding to the number of consecutive bits. However, it is alternatively possible to provide a separate bit or hole for each bit. FIG. 3f illustrates this and shows a track 4 in which the clock modulation structure is represented by different types of hatching. In the synchronization areas 8 the pits 13 may, for example, be formed in the centre of the maxima or minima of the structure and are also coated with the reflecting layer 6, which is symbolized by the hatching through said pits 13. In the information portion 9 the information holes 14 may be formed in the reflecting layer 6 at the maxima and minima of the clock information structure. Alternatively, as is represented by the information area 9 in FIG. 3f, holes 14' may be formed at the zero points of the clock information structure. In this respect the location of the pits 13 or holes 14 is not essential, provided the phase relationship with the clock information structure is fixed and known. Neither is the shape of the information structure of great significance. Instead of the rectangular shape shown in FIG. 3 it may well have a sinusoidal shape, which is readily possible in the case of manufacture by means of a modulated laser beam. It is of importance only that said clock synchronization structure exhibits a frequency component which can be readily detected at the frequency fo or 2fo and which exhibits no strong components within the spectrum of the synchronization or digital-information signal recorded or to be recorded, which is generally the case when the clock information structure d has a fundamental frequency fo or 2fo with higher order harmonics only. The next harmonic is then 2fo or 4fo, which as is shown in FIG. 4 falls beyond the part of the information spectrum which is of interest.

Figure 6A:
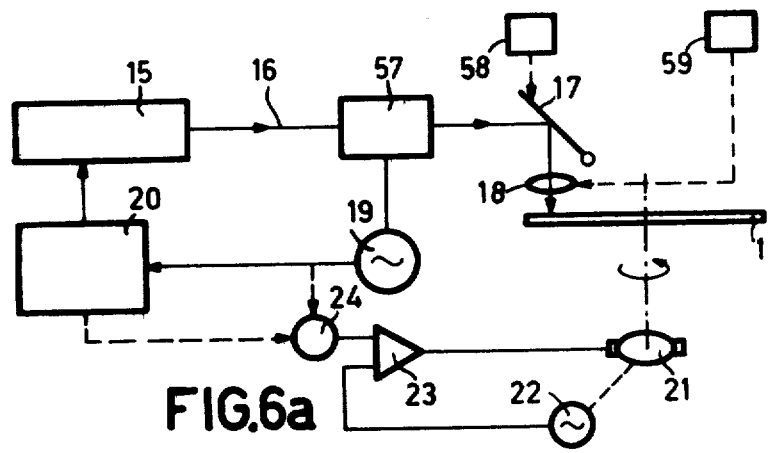
Figure 6B:
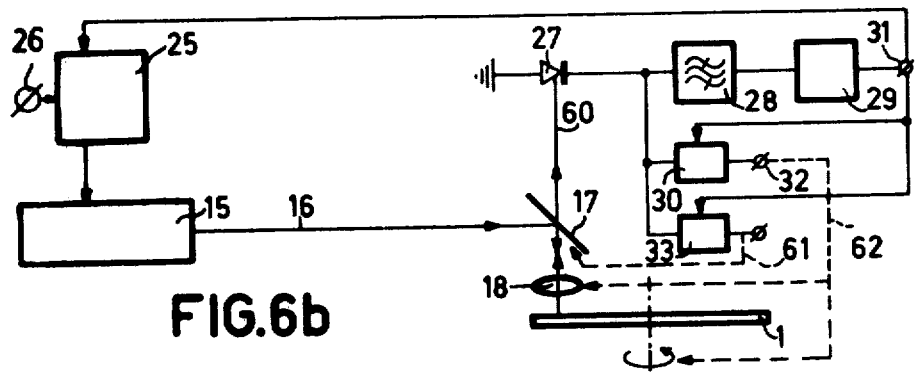
Figure 6C:
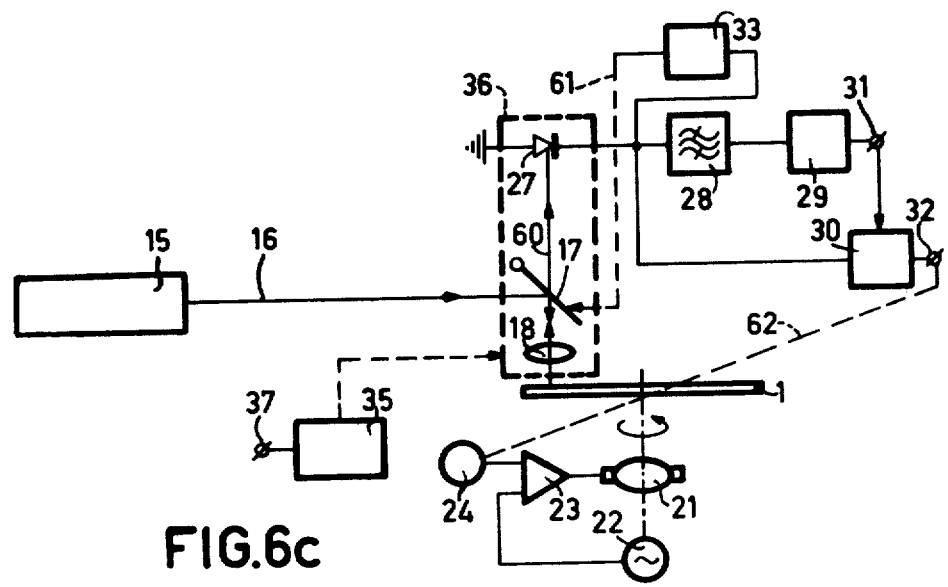

FIGS. 6a to 6c illustrate apparatus for forming and/or reading the structures shown in FIG. 3.

In the apparatus shown in FIG. 6a, the beam 16 from a laser 15 is projected at a rotating disc 1 via, for example an intensity modulator 57, a mirror 17 and a focusing optic 18, in order to form the spiral groove 4 (FIG. 1). Laser 15 is controlled by a circuit 20 for pulsing the laser 15 so as to form the pits 13 (FIG. 3) in the synchronization area 8. The modulator 57 is controlled by a source 19 having a frequency fo (or 1fo) in order to realize a clock modulation structure in the groove 4. Alternatively, it is possible to modulate the laser 15 itself. The disc 1 is driven by a motor 21 which for the purpose of speed control is provided with a servo control, which may, for example, comprise a tachogenerator 22, a feed reference source 24 and a servo-amplifier 23. In order to ensure that the recording areas 8 are situated at the correct location on the disc in the track 4 and, as the case may be, to obtain a correct tangential distribution of the modulation at fo on the disc, the circuit 20 and, possibly, source 19 of the frequency fo may be locked to the servo control. Furthermore, circuit 20 is controlled by source 19 in order to guarantee a correct phase relationship of the synchronization pits 13 with the clock modulation structure. After this process the disc 1 may be provided with the said layer 6.

FIG. 6b schematically represents an apparatus for providing the prepared disc 6 with information and simultaneously reading the clock modulation structure. This apparatus comprises the rotating disc 1, and a laser 15 whose beam 16 is projected onto the disc 1 via a semitransparent mirror 17 and a focusing optic 18. A reflected beam 60 is detected by means of a photodetector 27, in the form of a light sensitive element such as a photodiode, and converted into an electric signal from which by means of the band-pass filter 28 the component of the frequency fo (or 2fo) is extracted, which component is mainly produced by the clock modulation structure formed in the track 4. As the case may be, this signal may also be applied to a phase-locked loop 29 which improves the filtration, increases the constancy of the clock signal and, possibly, compensates for any brief signal dropout. The clock signal is then available on output 31. Data can be recorded by pulse modulation of the laser beam 16, directly by including a modulator in the beam or, as is shown in FIG. 6b, by modulating the laser 15 itself with a write modulator circuit 25, to which the information is applied via an input 26 and which is synchronized with the clock signal on output 31.

Via the photo-detector 27 and a read circuit 30, the information contained in the synchronization portions is recovered from the reflected beam 60, which information appears on an output 32. This read circuit 30 may also be synchronized with the clock signal on output 31. Said information may be used to synchronize the circuit 25 and to locate the correct position on the disc. This information is also used in a servo control, not shown in FIG. 6b, for radially positioning the optic 18 and mirror 17, for inscribing the desired portion of the track 4 and for controlling the drive of the disc 1, which is symbolically shown in FIG. 6b by means of the broken line 62.

Furthermore, the apparatus may be provided with a track circuit 33 which derives a tracking signal from the signal supplied by detector 27 in order to keep the beam 16 on the track 4 by controlling the angle, relative to the beam 16, of the mirror 17, which is shown symbolically by the broken line 61 in FIG. 6b.

FIG. 6c shows an apparatus for reading an inscribed disc 1, which apparatus is in practice generally combined with that of FIG. 6b. The apparatus again comprises a laser 15, whose beam 16 is projected onto the disc 1 via a mirror 17 and an optic 18. The reflected beam 60 is detected with a photodetector 27 and the resulting electric signal is passed through a band-pass filter 28 having a pass frequency fo and onto a phase-locked loop 29 tuned to the frequency fo, so that the clock signal of the frequency fo (or 2fo) is available at output 31. The information recorded on the disc is decoded from the electric signal supplied by the detector 27 by means of the read circuit 33, so that on an output 32 thereof the digital information and the information contained in the synchronization areas 8 is available. This read circuit is synchronized by means of the clock signal on output 31. In addition, a track signal may be derived from the beam detected by the detector 27 by means of a tracking circuit 33, in order to control the mirror 17 in such a way that the beam 16 exactly follows the track 4. The disc drive motor 21 may be included in a servo control, for example consisting of tachogenerator 22, a reference source 24, and a servo-amplifier 23, in order to control the speed, which control may be locked to the read circuit 30. Furthermore, the apparatus also comprises a control mechanism 35 for moving the optic 18 together with the mirror 17 and the detector 27—the complete mechanism being designated 36 in FIG. 6c—in a radial direction, so that at option a specific part of the disc can be read controlled by information applied to the input 37 of control mechanism 35 and by the information produced by the synchronization areas and available on output 32 of the read circuit 30.

Figure 7:
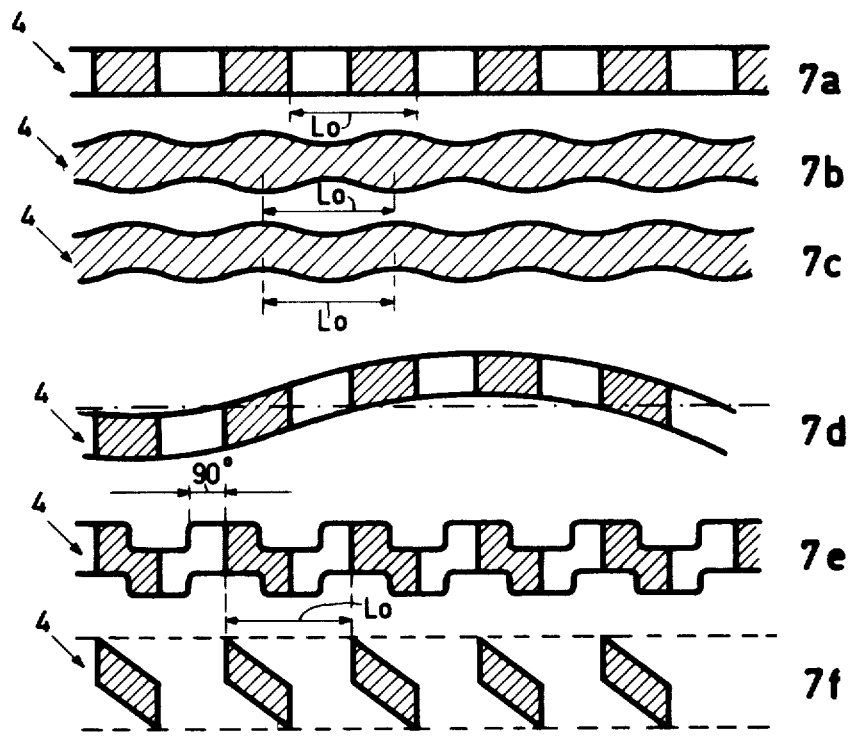
FIGS. 7a to 7f show a number of examples of a periodic track modulation in accordance with the above-mentioned prior application.

The clock information structure which is or has been recorded in track 4 may take various forms. FIG. 7 shows a number of examples thereof. FIG. 7a shows schematically a track 4 in which the clock information is formed by a height variation—symbolically represented by the interrrupted hatching—for example by modulating the intensity of the laser beam that writes the track 4. FIG. 7b shows the track 4 in which the clock information is formed as a width variation of the track 4, for example by modulation of the laser-beam focusing, for which, for example, the objective 18 (FIG. 6a) may be controlled by means of the device 59 (FIG. 6a). A combination of width and depth variations is also possible, which in practice will frequently be the case when the intensity or focusing of the laser beam is modulated. FIG. 7c shows the track 4 in which the clock information takes the form of a radial variation of the position of the track 4. This may be done for example, by modulating the angle of mirror 17 (FIG. 6c) relative to the beam 16 can by means of the device 58. All the variations shown then have a period length Lo which is equal to $Lo = V/f$, where V is the tangential speed of the disc 1 at said location and f the frequency of the desired clock signal. The clock frequency corresponds to a zero point in the random frequency spectrum of the data to be recorded, for example the frequency fo (FIGS. 4c and 5c) in the case of "quadphase" modulation.

One of the possible ways of obtaining a tracking signal is by providing a radial "wobble" in the groove-shaped track, for example by controlling mirror 17 (FIG. 6a). For example, the "wobble" may be a sinusoidally varying radial excursion with a wavelength on the disc which during playback at the normal speed produces a light intensity variation detected by the detector 27 (FIG. 6) of a frequency situated beyond the spectrum of the data, i.e. for example below the frequency 0.2fo (FIG. 4). For example by synchronous detection, a measure of the deviation of the centre of the detector relative to the centre of the track 4 may be derived from said signal component. Such a radial wobble can be combined with a clock modulation structure, for example, such as that shown in FIG. 7a, which combination is shown in FIG. 7b. A special combination is obtained when the wobble has a wavelength equal to that of the clock modulation structure with a fixed phase relationship, which makes synchronous detection superfluous. FIG. 7e shows such a structure, a depth modulation structure (represented by alternately hatched and non-hatched areas) in track 4 is combined with a radial position variation which is 90° shifted relative thereto, (i.e by a quarter of the period of this structure), which structure can be produced with the apparatus of FIG. 6a by modulating the angle of the mirror 17 relative to the beam 16 with the aid of device 58. If the depth modulation structure is then selected so that the "shallow" parts of these modulations coincide with the surface of the disc-shaped record carrier 1, the servo track 4 will take the form of a sequence of radially asymmetrical pits which are tangentially spaced from each other by distances equal to the said distance Lo. FIG. 7f shows an example of such a track 4.

Figure 8A:
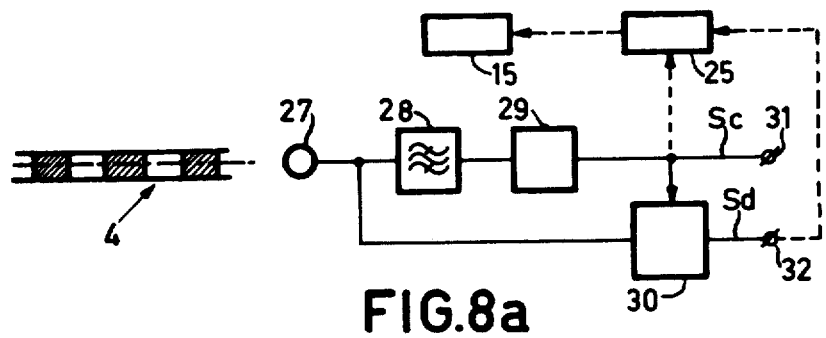
FIG. 8 shows the principle of a reading section of an apparatus for reading and/or recording a digital signal from or on, whatever the case, a record carrier in accordance with the above-mentioned prior application.
FIG. 8b shows the frequency spectrum of the signal detected by detector 27.
Figure 8B:
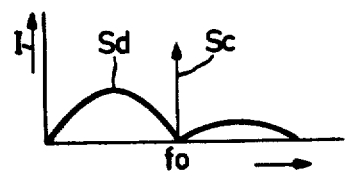

FIG. 8a illustrates the principle of the read section of an apparatus for writing data in or reading data from a record carrier in accordance with the prior patent application. The apparatus comprises a photodetector 27 which scans along the track 4. The signal I which is supplied by detector 27 has a spectrum as shown in FIG. 8b. In the present example the spectrum is of a quadphase modulated signal Sd and a clock signal Sc. The clock signal Sc is extracted by a band-pass filter 28, preferably followed by a phase-locked loop 29. The clock signal Sc is available on output 31. The digital signal Sd is the signal recorded in the synchronization area 8 and, during reading, the signal recorded in the synchronization area 8 and in the information area 9. Signal Sd is detected with a read circuit 30 which is synchronized with the clock signal Sc. The readout data signal is available on output 32. Furthermore, a radial tracking signal can be derived from the signal from the detector 27. When information is to be recorded in information areas 9 the circuit 30 only detects the information contained in the synchronization areas 8, which together with the clock signal Sc is then applied to the write circuit 25 in order to modulate the beam of a write laser 15.

Figure 9A:
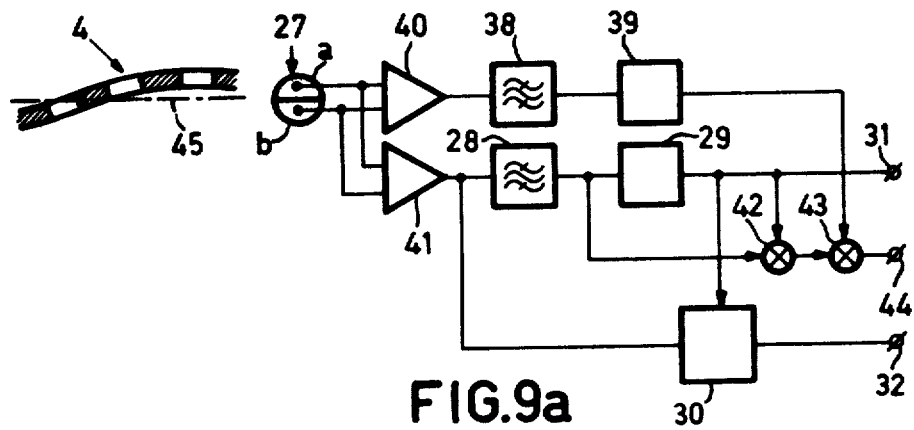
FIG. 9a shows an apparatus as shown in FIG. 8a, which is also suitable for generating a radial tracking signal
Figure 9B:
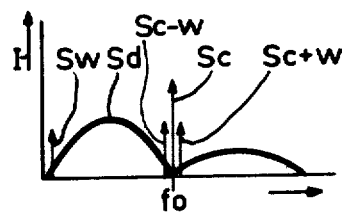
FIG. 9b shows the frequency spectrum of the signal detected by detector 27.

When a low-frequency radial wobble is used in order to obtain a radial tracking signal, the apparatus of FIG. 9a may be used. When a track 4 with a radial wobble is read, a photodetector 27 may be employed which is divided into two sections a and b along an axial line. A differential amplifier 40, or equivalent means, forms the difference of the signals detected by sections a and b and a summing amplifier 41 or equivalent means, provides the sum of said signals. The frequency spectrum of the detected signal is shown in FIG. 9b and again contains the spectrum of the quadphase modulated signal Sd, the clock signal Sc and the low-frequency signal Sw produced by the wobble. In the sum signal the wobble manifests itself as an amplitude modulation with the clock signal Sc as a carrier wave, which in FIG. 9b is represented as side bands $Sc - w$ and $Sc + w$. The side bands have an amplitude equal to zero when the detector 27 exactly follows the centre 45 of the track 4. Filtering this sum signal with the band-pass filter 28 yields the clock signal Sc and, provided this filter is not too narrow-banded, also said side bands. The output signal of that band-pass filter 28 is applied to the phase-locked loop 29 and on an output 31 thereof the clock signal Sc is available. The output signal of this band-pass filter 28 is also applied to a synchronous demodulator 42 together with the clock signal Sc. This demodulator then produces the modulation Sw.

The frequency of the radial wobble is recovered from the difference signal supplied by amplifier 40 with the aid of band-pass filter 39 and phase-locked loop 39, which frequency together with the output signal of the synchronous detector 42 is applied to a synchronous detector 43. The modulation of the wobble signal Sw is available at output 44 of detector 42 and may be used as a radial tracking signal since it is representative of the deviation of the detector 4 relative to the centre of the track 4, which in FIG. 9a is represented by the broken line 45. This radial tracking signal can then control the mirror 17 as is symbolically represented in FIGS. 6b and 6c.

The data contained in the track 4 is then recovered from the sum signal on the output of amplifier 41 in a similar way as in the apparatus of FIG. 8a. For the purpose of information recording, similar steps may be applied as in the apparatus of FIG. 8a, which are also valid for the apparatus of FIG. 10, FIG. 11a and FIG. 12.

Figure 10:
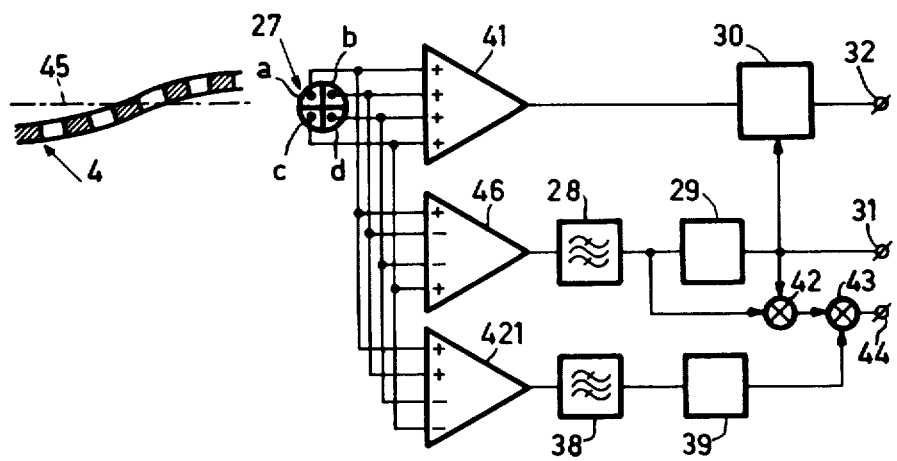
FIG. 10 shows a variant of the apparatus of FIG. 9a, FIG. 11a shows an apparatus as shown in FIG. 9a, arranged for a record carrier with a radial track modulation of substantially the same period as the periodic track modulation

FIG. 10 shows a variant of the apparatus of FIG. 9, which yields better signal separation. The detector 27 is also divided in accordance with a tangential line, so that four quadrants a, b, c and d are obtained. The sections a, b and c, d, respectively, are situated on either side of the tangential line and the sections a, c and b, d, respectively, are situated on either side of the radial line. An amplifier 41, or equivalent means, determines the sum of the signals generated by the sections a, b, c and d, so that this amplifier is particularly sensitive to intensity variations of the beam reflected by the track 4, i.e. to the data signal Sd. An amplifier 421 determines the difference between the sections $a+b$ and $c+d$, respectively, situated on either side of the tangential line, so that amplifier 421 is particularly sensitive to variations of the track 4 in a tangential direction, i.e. to the clock signal Sc. An amplifier 46 determines the difference between the sections a+c and b+d, respectively situated on either side of the radial line, so that this amplifier is particularly sensitive to variations of the track 4 in a radial direction, i.e. to the signal Sw corresponding to the wobble.

In a similar way as in the apparatus of FIG. 9a, the clock signal Sc is recovered from the output signal of amplifier 46 by means of band-pass filter 28 and phase-locked loop 29 and the frequency of the wobble signal Sw by means of band-pass filter 38 and phase-locked loop 39. The output signal of band-pass filter 28, which contains the wobble signal Sw as an amplitude modulation of the clock signal Sc, is detected synchronously with the clock signal by means of synchronous detector 42 and yields the wobble signal Sw whose amplitude variation represents the deviation of the detector 27 relative to the centre 45 of track 4. This signal Sw is detected synchronously with the output signal of phase-locked loop 39, i.e. with the wobble frequency by means of synchronous detector 43, so that the radial tracking signal appears on output 44. The data signal is recovered from the output signal of amplifier 41 which is synchronized by the clock signal Sc by means of the read circuit 30.

Mathematically, the operation of the apparatus of FIGS. 9a and 10 in respect of the recovery of the radial tracking signal may be explained as follows. The signal I detected by the detector 27 is a product of the clock modulation, the wobble modulation and the radial tracking error which (when ignoring the data signal) may be expressed as $$I = Ar \sin(w_w t) \sin(w_c t)$$

where Ar is a function of the tracking error, $w_w$ the angular frequency of the wobble signal Sw, $w_c$ is the angular frequency of the pilot signal Sc, and t the time. Synchronous detection with the pilot signal Sc yields the term $Ar \sin(w_w t)$ and the subsequent synchronous detection with the wobble frequency $w_w$ yields the signal Ar.

Figure 11A:
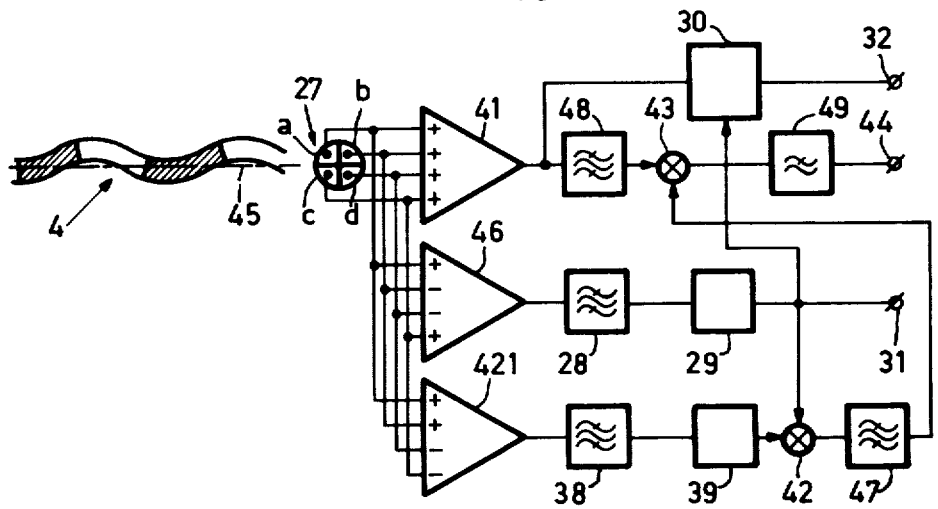
FIG. 11b shows the frequency spectrum of the signal detected by the detector 27.
Figure 11B:
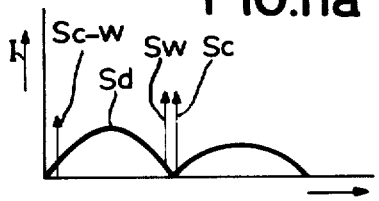

FIG. 11a shows a read section of an apparatus for reading data from a track 4 with a clock modulation structure and a wobble for deriving a radial tracking signal, the frequency of the wobble signal Sw being substantially equal to the frequency of the clock signal Sc. FIG. 11b shows the frequency spectrum in which Sd represents the data signal. Sc−w represents the term having a frequency equal to the difference between the frequencies of the clock signal Sc and the wobble signal Sc, which difference is, for example, 30 kHz. Said term is obtained in that the detector 27 receives the product of the wobble modulation and the clock modulation. As a result of this, the term Sc−w is situated in the low-frequency part of the spectrum and is hardly disturbed by the digital information. The amplitude of this term constitutes the radial tracking signal. The amplitude is zero if the centre line 45 of the track is followed exactly. The wobble then yields a term of double the difference frequencies, which term is not used, and a term with the wobble frequency itself.

The apparatus, in a similar way as the apparatus of FIG. 10, comprises an amplifier 41 for supplying the sum of the signals supplied by sections a, b, c and d of the photodetector 27, from which sum the term of said difference frequency is extracted by means of band-pass filter 48. With the aid of synchronous detector 43 to which the difference frequency is applied, this term is modulated and, as the case may be via a low-pass filter 49, the radial tracking signal appears on output 44.

The clock signal Sc is obtained in a similar way as in the apparatus of FIG. 10 by determining the difference between the signals produced by the two radial halves a+c and b+d, respectively, of photodetectors 27 with amplifier 46 and applying said difference to phase-locked loop 29 after filtration with band-pass filter 28. In a similar way as in the apparatus of FIG. 10, the wobble signal Sw is derived by determining the difference between the signals produced by the two axial halves a+b and c+d, respectively of the photodetector 27 with amplifier 421 and applying this to a phase-locked loop 29 via a band-pass filter 38. The difference frequency applied to the read circuit synchronous detector 43 is obtained by applying the clock signal Sc thus obtained and the wobble signal Sw to a synchronous detector 42, after which the resulting signal of said difference frequency is applied to synchronous detector 43 via band-pass filter 47.

With the read circuit 30, synchronized with the clock signal Sc, the data signal can be recovered from the output signal of amplifier 41.

If the frequency of the wobble signal Sw is selected to be equal to the frequency of the clock signal, it will be evident from FIG. 11b that the term with the difference frequency directly constitutes the DC tracking signal. This tracking signal can then be obtained without synchronous detection.

The phase difference between the two track modulations should not be equal to zero, because only one modulation can be distinguished when the two modulations are in phase. It is found that 90° is an optimum phase difference.

Figure 12:
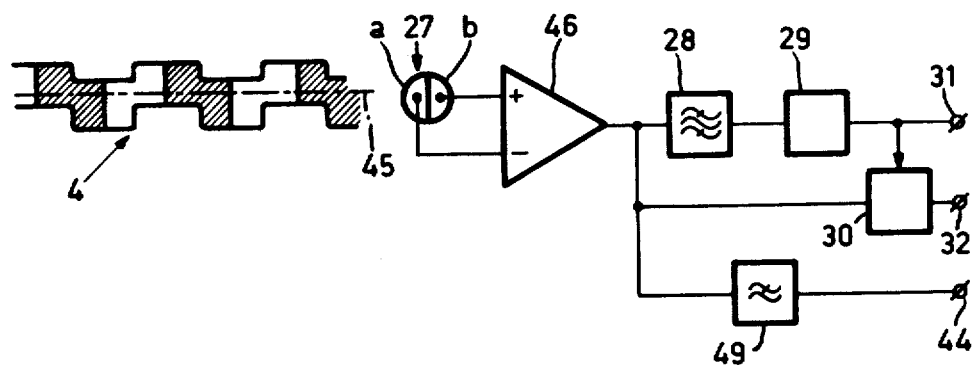
FIG. 12 shows an arrangement arranged for a record carrier with a radial track modulation of the same period as the periodic track modulation.
Figure 13:
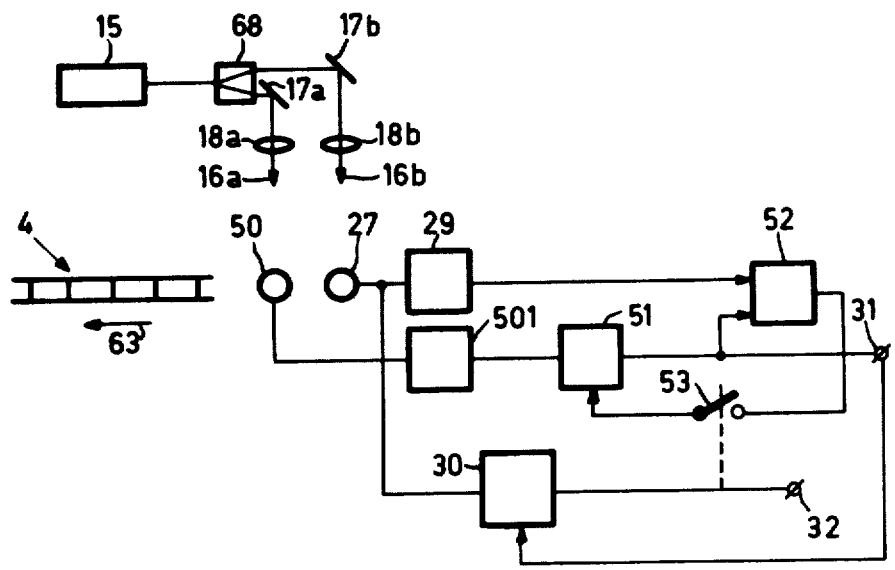
FIG. 13 shows a portion of an apparatus for recording an information signal on a record carrier in accordance with the above-mentioned prior application for generating a clock signal during recording, using an auxiliary laser beam.

FIGS. 7e and 7f show such a structure which can be read with the simple read circuit of FIG. 12.

In the apparatus of FIG. 12, the photodetector 27 is divided into two radial halves a and b for an optimum detection of the clock signal Sc. Signal Sc is obtained on output 31 by determining the difference between the signals supplied by the two halves a and b with amplifier 46, by filtering said signal with band-pass filter 28 and applying it to the phase-locked loop 29. By filtering the output signal of amplifier 46 with a low-pass filter 49, the radial tracking signal is directly available on output 44. The digital signal is recovered from the difference signal with read circuit 30, which is synchronized with the clock signal Sc. Alternatively, it is possible to recover the data signal and the low-frequency tracking signal from the sum of the two halves.

In respect of the tracking during the recording of data signals, the apparatus in accordance with FIGS. 8a to 12, inclusive may be extended with a device modulating a laser beam 16, which device is synchronized with the clock signal Sc and the signal read from the synchronization areas, as has been explained with reference to FIG. 6b.

In the foregoing it has been assumed in each case that one photodetector 27 is used which detects the reflected beam 16 (FIG. 6). Especially at high bit frequencies it may be problematic, when recording data in the information areas 9 with a laser beam which is comparatively powerful relative to that used for reading, to recover the clock information from the beam which is reflected between every two write pulses. As in many cases a follower laser beam is employed in order to enable the recorded signal to be detected, the apparatus of FIG. 13 may be used in such cases. In that system the track 4, which relative to the photodetector 27 travels in the direction of arrow 63, is scanned by an information-writing beam 16a and a follower beam 16b. The beams can, for example, be obtained by means of a beam splitter 68, mirrors 17a and 17b and optical systems 18a and 18b. In order to modulate the beam 16a, a modulator may be arranged in the pah of beam 16a. The apparatus comprises a photodetector 27 which in respect of the reading of data signals and tracking signals fully corresponds to the apparatus in accordance with any of the FIGS. 8a, 9a, 10, 11a and 12a. Furthermore, the apparatus comprises a photodetector 50 for detecting the reflection of the follower beam 16b which is projected at the track at some distance behind the beam 16a. During the read process and also when the synchronization areas 8 are being read, the clock signal Sc is obtained by applying the signal detected by photodetector 27 to the phase-locked loop 29 via an amplifier and a band-pass filter which for simplicity are not shown in this Figure (for example 46 in FIG. 11a and for example 28 in FIG. 11a, respectively). In addition, in particular during the writing process, said clock signal is also recovered in a similar way from the signal detected by photodetector 50, as the case may be via a band-pass filter, not shown, and via a phase-locked loop 501, but this signal is delayed relative to the clock signal obtained via photodetector 27 by delay device 51, the output signal of which supplies output 31. The phase of the delayed clock signal is then compared with the phase of the clock signal obtained by means of the photodetector 27 in phase comparator 52 and via switch 53 the delay device 51 is adjusted so that the clock signal from photodetector 50, which has been delayed via delay device 51, is in phase with the signals obtained via photodetector 27. During the read-out of the synchronization areas 8, switch 53 is closed and the delay device 51 is adjusted so that the clock signal from photodetector 50, which has been delayed by said delay device 51, is in phase with the clock signal obtained via photodetector 27. During the recording of data in the information areas 9, switch 53 is open and the clock signal is recovered from the reflected auxiliary beam 16b via photodetector 50 and is delayed with the delay device 51 by an interval adjusted during the read-out of the synchronization areas 8. The switch 53 is operated on command of the synchronization signals read from the synchronization areas by the read circuit 30.

In this respect it should be noted that writing information with unit bits, i.e. recording the information with separately detectable changes in the surface structure of the record carrier, as shown in FIG. 3f, yields a frequency component at the frequency 2fo in the spectrum (FIG. 4) of the signal being read. This need not be a problem when using a clock modulation structure, because this clock modulation, if it has a frequency equal to 2fo, may be used when recording information, and if during recording a correct phase relationship with the clock signal is maintained during read-out it will coincide with the component 2fo as a result of the use of unit pits. When quadphase modulation is used (FIGS. 4c and 5c) the clock signal will have a frequency equal to fo and in that case said component of frequency 2fo creates no problem.

Figure 14:
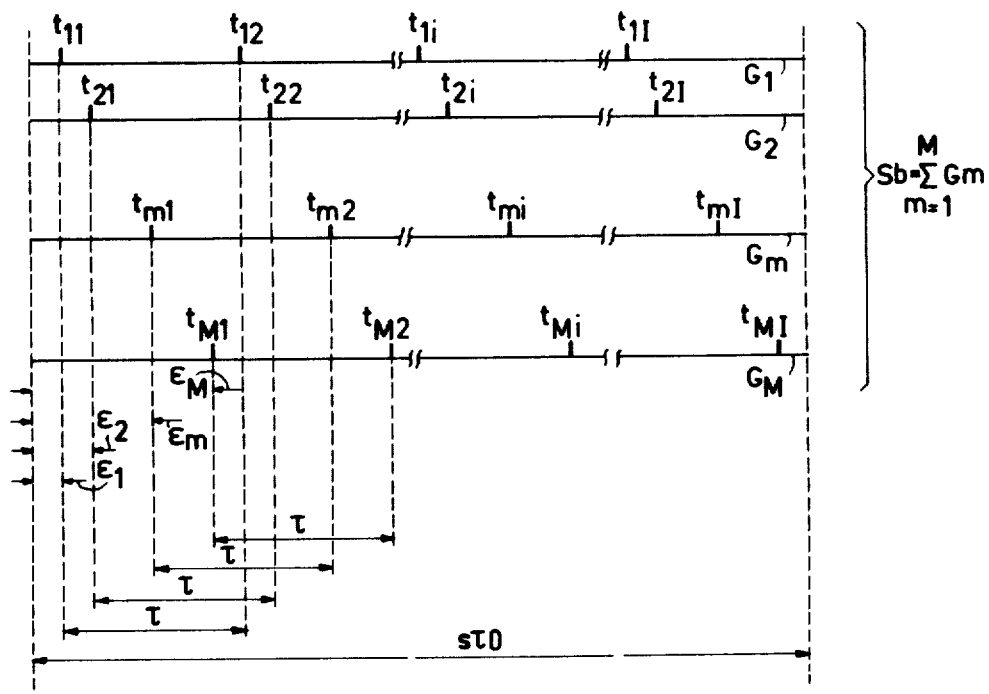
FIG. 14 is a diagram for illustrating the code to be used in the transmission system in accordance with the invention.

FIG. 14 is a diagram which explains the structure of the code employed in the transmission system in accordance with the invention and shows the various parameters with which that code can be defined. The coded signal consists of consecutive symbols $S_b$, each having a duration $s\tau_0$, where s is a positive integer and $\tau_0$ a time interval. Each symbol $S_b$ is considered to be formed from the superpositioning of M groups $G_m$, where m is a number from 1 to M. In each group $G_m$, I positions $t_{mi}$ are occupiable by pulses, where m is the number of the group $G_m$ and i is a number with the group $G_m$ and extending from 1 to I. The first position $t_{m1}$ within each group $G_m$ is located at a time interval $\epsilon_m$ from the beginning of the symbol $S_b$. Within each group $G_m$ the positions $t_{mi}$ are spaced by equal time intervals $\epsilon$. For the number of positions I within a group then the restriction $\epsilon_m + (I-1)\tau < s\tau_0$ holds, as all positions $t_{mi}$ must be within the symbol duration $s\tau_0$. Furthermore it holds for the code that in each group $G_m$ a constant number of k positions are always occupied, the constant k being the same for each group and smaller than I. Hence, k positions of the I possible positions within each group are always occupied.

Figure 15:
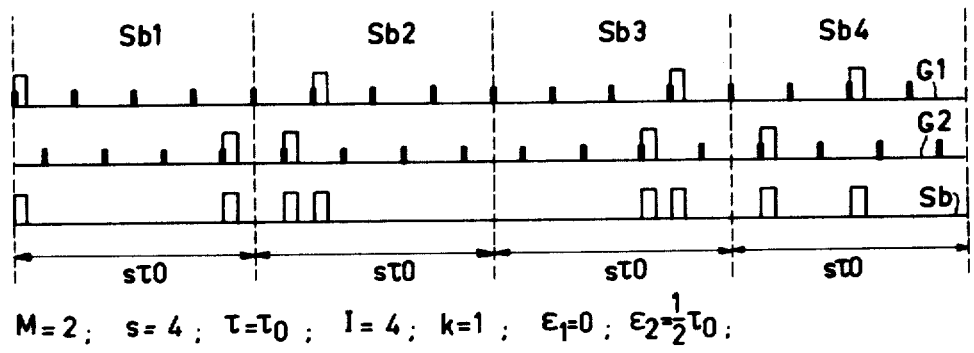
FIG. 15 is a diagram for illustrating the structure of code words for a choice of a code to be used in the transmission system in accordance with the invention.

To further explain the code of FIG. 14, FIG. 15 shows an example with 2 groups $G_1$ and $G_2$ (M=2), each having 4 positions to be occupied (I=4), wherein $\tau = \tau_0$, s=4, $\epsilon_1 = 0$, $\epsilon_2 = \frac{1}{2}\tau_0$ and k=1. One position of all four positions of a group is always occupied and the positions in both groups have locations which are shifted a time interval $\frac{1}{2}\tau_0$ relative to each other. FIG. 15 shows four consecutive symbols $S_{b1}$, $S_{b2}$, $S_{b3}$ and $S_{b4}$, each with any optional position occupation, and the signal $S_b$ obtained by superpositioning the two groups $G_1$ and $G_2$.

As regards the composite signal $S_b$ the code is therefore characterized in that per symbol the same number of positions are always occupied and that the occupied positions are uniformly distributed over M groups which have been shifted a fraction of the duration $\tau$ relative to each other. In the example of FIG. 15, 8 possible positions can be occupied within one symbol—four from each group—of which two are always occupied, one in order of priority on an odd position and one in order of priority on an even position.

Such a uniform distribution of positions over groups which are shifted fractions of the time duration $\tau$, the position within each group being located at mutual time intervals $\tau$, has appeared to be very advantageous in practice as regards maintaining the phase relationship with a clock signal which, as regards its angular frequency $w_c$, is related to the duration $\tau$, so for example, a clock signal having an angular frequency $w_c = 2\pi/\tau$.

If the random power spectrum of a code modulated signal defined on the basis of FIG. 14 is calculated, which calculation is not shown here because of the fact that it is so complicated, then this spectrum appears to consist of a continuous portion having zero points at angular frequencies $w = n \cdot 2\pi/\tau$, where n is an integer, and of a dirac spectrum at angular frequencies $w = \lambda \cdot 2\pi/s\tau_0$, where $\lambda$ is an integer, which sequence of dirac peaks exhibits a certain frequency-dependent amplitude distribution D(w).

In view of the use of clock signals, the zero points in the continuous spectrum are desirable to enable the clock frequency to be selected so as to correspond to a zero point of the continuous spectrum. In respect of the clock signal, two cases can be distinguished. In the first case, a dirac peak present in the coded signal is employed as a co-transmitted clock signal, in which event a dirac peak can be selected in a zero point of the continuous spectrum. In the second case, a clock signal is added to the coded signal, it then being prohibited for a dirac peak to be present in that zero point of the continuous spectrum in which the added clock signal is positioned, in order to prevent interference from occurring. In a given zero point of the continuous spectrum the dirac spectrum is equal to zero for the case that $n \cdot 2\pi/\tau$ is unequal to $\lambda \cdot 2\pi/s\tau_0$, which is certainly the case for each zero point in the continuous spectrum when $\tau$ is non-rationally related to $\tau_0$. In the most realistic conditions occurring in practice, $\tau$ will substantially always be rationally related to $\tau_0$. As a result, dirac peaks will occur in the zero points of the continuous spectrum, which situation can be used for the first case by extracting such a dirac peak and to employ it as the clock signal. In those cases where $\tau_0$ is rationally related to $\tau$, zero points in the dirac spectrum may coincide with zero points in the continuous spectrum by having the amplitude function $D(w)$ of the sequence of dirac peaks be equal to zero at a zero point in the continuous spectrum in which a clock signal must be added.

The last-mentioned possibility can be investigated for each individual case by the selection of a number of parameters. In the following consideration $s \, \tau_0 = I\tau$ is opted for, the symbol length $s \, \tau_0$ is therefore as large as the number of I occupiable positions $t_{mi}$ at mutual time intervals per group $G_m$ together. This is the most realistic choice, because if $s \, \tau_0$ is chosen to be larger than $I \, \tau$, the symbol is unnecessarily long which has a negative effect on the information density. If $s \, \tau_0$ is chosen to be smaller than I this may result in overlapping of adjacent symbols. That is, in practice $\tau$ is chosen to be as small as possible. For example, in the case of an optical record carrier the information pits will be chosen to be as short as the optical resolving power of the system allows and the time interval between two occupiable positions will be chosen to be correspondingly minimal. Taking the possibility that $M-1$ other pits from the remaining groups $G_m$ may occur therebetween into consideration, this results in impermissible overlapping of adjacent symbols. Furthermore, the lowest zero point unequal to $w=0$ is selected to be the zero point in the continuous spectrum so for $n=1$ where $w_0 = 2\pi/\tau = 2\pi/\tau_0$. This is again the most practical choice since the signal frequencies will be chosen as high as possible and, with a view to bandwidth and in the example of an optical record carrier with a view to the resolving power, the lowest zero point $w_0 = 2\pi/\tau_0$ is therefore most suited to have a clock signal added to it. With the above-mentioned choice parameters it appeared that the amplitude distribution $D(w)$ has a zero point at $w_0 = 2\pi/\tau_0$ when the initial positions $\epsilon_m$ are located at equidistant time intervals, so for $\epsilon_m = \epsilon_1 + m - 1/M \, \tau_0$. For the remaining cases, for example $\epsilon_m = \epsilon_1 + m - 1/M + \delta \, \tau_0$, where $\delta$ is a factor representing the deviations in the distance between the initial positions $\epsilon_m$ of $\tau_0/M$, there occurs in the zero point $w_0 = 2\pi/\tau_0$ a dirac peak which may possibly be used as clock signal. $\delta$ is selected to be larger than 0, which causes the initial positions to be located at time intervals shorter than $\tau_0/M$. Extending said intervals relative to $\tau_0/M$ is not feasible practically since then the length of the symbol must be increased unnecessarily.

The above-mentioned choice, with equidistant initial positions $\epsilon_m$ at mutual time intervals $\tau_0/M$ also yields a zero point in the dirac spectrum at $2w = 4\pi/\tau_0$, M being equal to 4p, where p is an integer larger than or equal to 1. For other values of M, for example M=3 there occurs in the zero point $2w_0$, a dirac peak which may be used for clock information but in the example where an optical record carrier is employed this dirac peak is not advantageously located with a view to the optical cut-off frequency.

When a dirac peak is selected to be the clock signal, several parameters can be chosen in such a way that the amplitude function $D(w)$ at the angular frequency of the clock signal is at a maximum in order to obtain the strongest possible clock signal, it then being necessary that also over variables, such as information density etc. must be optimized. A general rule can not be given for this.

It should here be noted that always, and irrespective of the code opted for, a dirac peak can be generated in the spectrum by means of a structural non-uniformity in the pit positions.

For the above-mentioned choice of a zero point both in the continuous spectrum and in the dirac spectrum at $w_0 = 2\pi/\tau_0$ several parameters can be further determined in the following manner, wherein the following choices have already been made: $s=I$, $\tau=\tau_0$ and $\epsilon_m = \epsilon_1 + m - 1/M \, \tau_0$. In the first instance the choice is made that $K=1$, i.e. one occupied positions per group. One symbol then has $I^M = S^M$ possible occupations, so that it holds for the number B of binary bits to be coded per symbol that:

$$2^B = S^M \text{ or } B = M \log_2 s \quad (1)$$

wherein B is the number of bits per symbol. So it holds for $S=4$ and $M=2$ that $B=4$.

In the example of an optical disc a minimum pit diameter $d_0$ is indicated, owing to the optical resolving power. For each symbol, for $k=1$, SM positions occur per symbol which must be occupiable by pits having a diameter $d_0$. The highest tangential disc speed occurs along the innermost track of a disc and is there equal to V, which is a given parameter. So, for the requirement that SM positions with diameters $d_0$ per symbol occur on that innermost track it holds that:

$$SMd_0 \leq s\tau_0 V \text{ or } Md_0 \leq \tau_0 V \quad (2)$$

A first criterion is now found when it is assumed that a maximum quantity of information on a disc is opted for. This quantity of information may be expressed as the quantity of B bits binary information for each unit of track length on that innermost track and for this characteristic bit density CBD it therefore holds with expression (2):

$$CBD = \frac{B}{s\tau_0 V} \leq \frac{\log_2 s}{sd_0} \quad (3)$$

A second criterion which is of specific importance when solid state lasers are used to burn pits in which the information is recorded, is the number of reproduced bits B* for each burned hole, which parameter B* represents the average required laser power for a given information density BCD. B* is equal to the number of bits per symbol B divided by the number of pits M per symbol or:

$$B^* = B/M = \log_2 S \quad (4)$$

From the foregoing it follows that, in order to enable selection of the code, the expressions 3 and 4 must be maximized. However, as regards expressions 3 and 4, the further restriction may be introduced that the number of bits per symbol must be an integer. Since the parameter M is an integer, it follows therefrom that the parameter s is an integer only when B/M is also an integer, since $s=2^{B/M}$. So the number of bits per bit (B/M) is also integer. So there can be defined a parameter UB*, the useful number of bits per pit being defined by:

$$UB^* = G(B/M) = G(\log_2 s) \quad (5)$$

the designation G(...) being a symbol for "integrated value of". Likewise, for that bit density which is related to the disc parameters $d_0$ and V the useful bit density UBD can be derived from relation (3):

$$UBD \leq G(\log_2 s)/sd_0 \quad (6)$$

Figure 16:
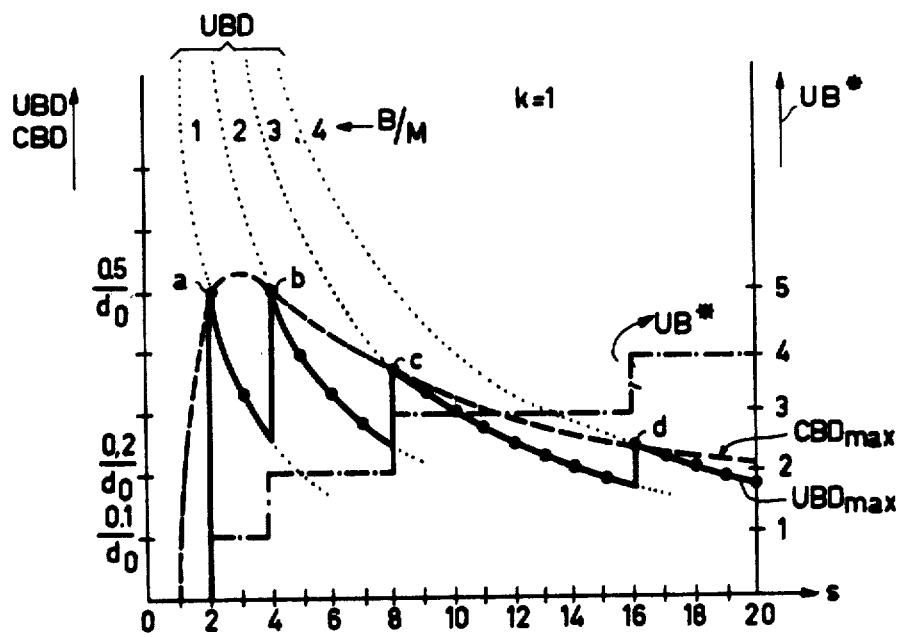
FIG. 16 is a diagram for illustrating the choice of a code for the parameter $k = 1$.

Both parameters represented in expressions 5 and 6 can be optimized by the choice of the code. To this end FIG. 16 shows the parameter UB* as a function of s. To construct the parameter $UBD_{max}$ as a function of s, FIG. 16 also shows the function UBD for several integral values of B/M, at which the maxima of UBD in accordance with expression 6 are always located. For UBD it further holds that this maximum is equal to $CBD_{max}$, the maximum of CBD (expression 3), for which FIG. 16 shows the function $CBD_{max} = \log_2 s/S d_0$.

The function $UBD_{max}$ is obtained by selecting within the curve $CBD_{max} = \log_2 s/S d_0$ the maximum value of the parameter B/M on the curves of UBD for integral values of B/M. Since for S the practical restriction that s im an integer also applies, useful codes are found to be those codes which are represented in FIG. 16 by dots on the curve for $UBD_{max}$. When a maximum $UBD_{max}$ is opted for the then points a, b, c, d become eligible, point b having preference to point a as both yield the same value for $UBD_{max}$, however the highest value of UB* is associated with point b. If comparatively much importance is assigned to the value of UB* then the point c and d, respectively, may be used in this order. If the point b is opted for then s is chosen to be equal to 4. These choices are independent of the parameter M which does not influence the expressions (5) and (6). However, M does influence the symbol length s $\tau_0$ since, for given disc parameters $d_0$ and V, it follows that $\tau_0$ increases with an increasing value of M. In view of the complexity of the decoding of the symbol, short symbols are preferred, so that a logic choice for M is M=2. From FIG. 16 it then follows that the most optimum choice for the code is the code which is defined by the following parameters $$s = I = 4; M = 2; K = 1; \tau = \tau_0; \epsilon_2 = \epsilon_1 + \tfrac{1}{2}\epsilon_0 \quad (8)$$

Figure 17:
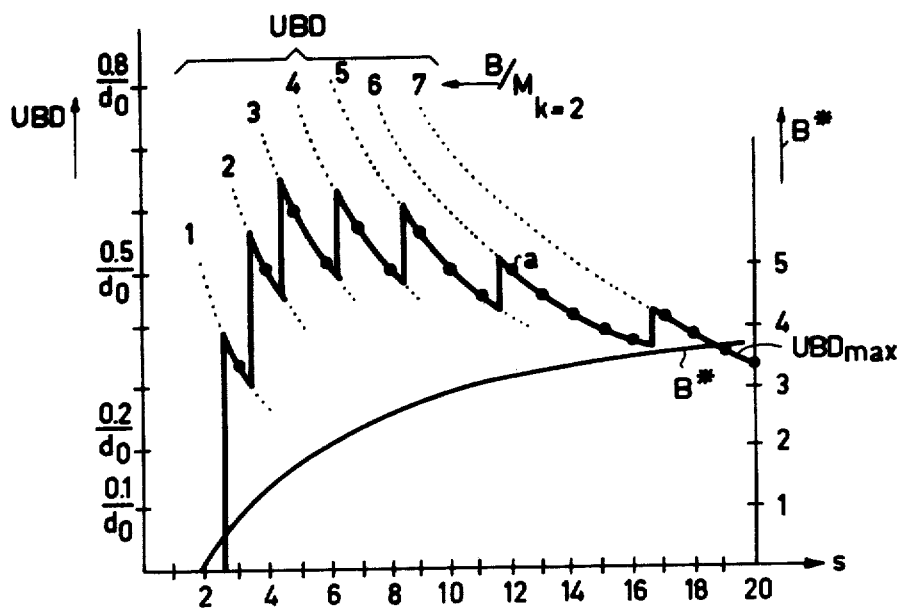
FIG. 17 is a diagram in accordance with FIG. 16 with parameter $k = 2$.

The considerations in the foregoing hold for k=1. for k>1 the same equations hold with $\log_2 (s!/(s-k)!!)$ instead of $\log_2 s$, as the number of combinations which are possible and, consequently, the number of bits B has been changed correspondingly. By way of illustration FIGS. 17 and 18 show graphs which correspond to the graph of FIG. 16 with k=2 and k=3, respectively, only UBD, $UBD_{max}$ and B* having been shown. From those Figures it appears that with an increasing factor k higher useful bit densities UBD are possible at a higher number of bits per pit B*. A disadvantage is, however, that this occurs at a higher value of s $\tau$ in connection with the position shown in FIG. 16, which results in longer symbols s $\tau_0$ and consequently in more complex decodings. Also here it holds that the choice to be made must be based on the appraisal of various factors. If the symbol length is not so important then an advantageous choice is, for example, k=2 with s=12 (point a in FIG. 17) with the same UBD as point b in FIG. 16, however with a higher factor B*. An alternative choice in this respect is therefore K=3, s=20 (point a in FIG. 4).

With the coding opted for, as defined in expressions (8), 16 combinations are possible for each symbol. Hence, four bits of binary information can be coded for each symbol, for which a coding table may, for example, be drawn up, which is stored in a memory and is read as a function of the signal to be coded. A more attractive possibility is to compose the coding table such that this coding can be accomplished in a simple way, which also applies to decoding. FIG. 19a shows such a table. The 16 possibilities to occupy two positions out of the eight positions of each symbol of $S_b$ is shown on the left, the binary values of four bits $b_1, b_2, b_3$ and $b_4$ chosen for this situation being shown on the right. The table has been composed in such a way that the bits $b_1$ and $b_2$ fix the positions in the first group $G_1$ (positions 1, 3, 5 and 7) and the bits $b_3$ and $b_4$ fix the positions in the second group $G_2$ (positions 2, 4, 6 and 8). This is schematically shown in FIG. 19b, where every possible occupied position in group $G_1$ is given by one of four possible combinations of the bits $b_1$ and $b_2$ and every possible occupied position in group $G_2$ is given by one out of the four possible combinations of the bits $b_3$ and $b_4$. So the positions to be occupied as a function of the inputs bits $b_1, b_2, b_3$ and $b_4$ can be obtained in a simple way by means of two-out-of-four decoders which are commercially available in the form of an IC of the two-in-one type, for example the Signetics IC with type-indication HEF 4555.

FIG. 20a shows a modulator for coding a binary signal in accordance with the table of FIG. 19a. This modulator comprises an input shift register 101, assembled for example, from the series arrangement of two four-bit shift registers marketed by Signetics with type-indication 74195. This shift register 101 has 8 parallel inputs 110 to 117, inclusive in order to enable the reception of binary values of 8 bits in parallel. A series input 105 enables the reception of binary information in series. The register also has eight parallel inputs 118 to 125, inclusive, a clock input 106, the information being shifted on the command of the clock signal $c_1$ present thereon, and an input 107. It is possible for the information present on the parallel inputs 110 to 117 inclusive to be entered into the shift register 101 on the command of the clock signal $c_2$ present on input 106. The clock signal $c_1$ as shown in FIG. 20b is applied to input 106. In response to each pulse of the clock signal the information in the shift register is advanced one position. By means of the clock signal $c_2$ on input 107, 8 bits are each time entered in parallel.

If binary information is applied to input 105, then this information is shifted through the shift register. On output 125 then there appear, one after the other, the consecutive bits in the form of a sequence $S_i$ (FIG. 20b).

At a predetermined instant $t_1$ (FIG. 20b), the first bit $b_1$ of a 4-bit input word will have arrived at output 125. The bits $b_2, b_3$ and $b_4$ are then present on outputs 124, 123 and 122, respectively. Four periods of the clock signal $c_1$ later, the next four-bit input word is present on the outputs 122, 123, 124 and 125. So on outputs 122 to 125, inclusive there appear, one after the other, at moments which are four periods of the clock signal $c_1$ apart, the consecutive four-bit input words.

If the information is applied to inputs 110 to 117, inclusive in the form of 8-parallel bits then, after these bits have been entered in response to a pulse of the clock signal $c_2$, a four-bit word is present on outputs 122-125, inclusive. Four periods of the clock signal $c_1$ later the four-bit words, applied via inputs 110 to 113, inclusive are present on outputs 122 to 125, inclusive. Thereafter, eight new bits are entered on the command of the signals $c_2$.

Thus, the function of shift register 101 is to combine binary information into consecutive words of four bits $b_1$, $b_2$, $b_3$ and $b_4$ on the respective outputs 125, 124, 123 and 122, this binary information having been applied optionally in series or in 8-bit parallel. In accordance with the table of FIG. 19a, these words are converted by connecting the outputs 125 and 124 (bits $b_1$ and $b_2$) to the inputs 129 and 128 of a one-out-of-four decoder 102 and by connecting the outputs 123 and 122 (bits $b_3$ and $b_4$) to the inputs 127 and 126 of a one-out-of-four decoder 103. The outputs 130 to 133, inclusive and 134 to 137, inclusive, respectively of the one-out-of-four decoders 102 and 103 are alternately connected to consecutive parallel inputs 140 to 147, inclusive, of an 8-bit shift register 104, which may be of a similar construction as shift register 101. As a result, one of the four inputs 141, 143, 145 and 147 is occupied as a function of the bits $b_1$ and $b_2$ and one of the four inputs 140, 142, 144 and 146 is occupied as a function of the bits $b_3$ and $b_4$, so that at those instants (e.g. instant $t_1$ in FIG. 20b) at which a four-bit word to be coded is present on outputs 122 to 125, inclusive, of shift register 101, the word coded in accordance with the table of FIG. 19b is present on the inputs 140 through 147 of shift register 104. On the command of a signal $c_3$ at input 1-8 at instant $t_2$, which is produced a short period of time after instant $t_1$ to compensate for the delay in the decoders 101 and 102, the coded word is entered into shift register 104. On the command of a clock signal $c_4$, applied to input 109 of shift register 104, the coded information shifts through shift register 104 to an output 138 of that shift register and on said output there appear one after the other, the coded symbol $s_b$. Hence, shift register 104 operates as a parallel series converter of the output signals from decoders 102 and 103.

Since 4 bits in the shift register 101 are converted into 8 bits in the shift register 104, the frequency of the clock signal $c_4$ is twice the frequency of clock signal $c_1$.

Generally, a simple modulation can be obtained when a coding table is chosen such that the k positions per group $G_m$ are fixed by predetermined bits from the input words to be coded. The modulation is then effected by means of M decoders, which each record k possible positions of I positions as a function of the corresponding bits from the input word, M, k and I being the parameters defined with reference to FIG. 14.

An embodiment of a demodulator for a signal modulated in accordance with the table of FIG. 19b will now be described with reference to FIG. 21, FIG. 21b which show the circuit diagram of the demodulator. FIG. 21a shows a diagram for explaining the function and the operation of that demodulator.

In order to demodulate a signal which has been coded in accordance with the method described above, each time at least each group must be detected in its totality, which means that a shift register or a delay line is required. In the demodulator shown in FIG. 21b, said delay networks 149, 141 and 153, each having a time delay equal to $\tau_0$ are provided between an input 148 and a point 154. At a proper moment the signals of a predetermined symbol on the first, third, fifth and seventh positions, that is the signals of group G are present on point 154, the junction 152 between delay networks 151 and 153, the junction 150 between delay networks 151 and 149 and input 148, respectively. A time $\frac{1}{2}\tau_0$ later group $G_2$ with positions 2, 4, 6 and 8 is present on said points.

One difficulty with demodulation, particularly when the signal from, for example, an optical record carrier is read, is that the signal levels are not accurately defined owing to noise etc. From the coding method it follows that for each group there is always one and only one position where the signal shows an unambiguous maximum. In the table of FIG. 21a, the four possible occupied positions 1, 3, 5 and 7 of Group $G_1$ are indicated in the four left-hand columns and a cross indicates which position is occupied in each row. If the difference between the signals coming each time from two positions is measured by means of comparators $V_1$ to $V_{12}$, inclusive, the comparators $V_1$ and $V_{12}$ determining the difference between the positions designated in the table whilst referring to the relevant comparator, then the results shown in the table are obtained. A result "+" is obtained when the signal coming from an occupied position is compared with the signal coming from an unoccupied position, a result "−" is obtained when the signal from an unoccupied position is compared with the signal of a compared position, and a result "?", i.e an unknown result, occurs when the signals coming from two unoccupied positions are compared. From the table it follows that the three comparators which compare the signal coming from an occupied position with the signals coming from the unoccupied positions all yield a "+" as output signal, while in any other group of three comparators "−" is always obtained as a result. A detection of the occupied position can then be obtained by applying the output signals of the comparators in a group of three to an AND-gate, so the outputs of the group of comparators ($v_1$, $V_2$, $V_3$)—($V_4$, $V_5$, $V_6$)—($V_7$, $V_8$, $V_9$) and ($V_{10}$, $V_{11}$, $V_{12}$) to the AND-gates $A_1$, $A_2$, $A_3$ and $A_4$, respectively, as shown in the table of FIG. 21a. By combining the outputs of these comparators with two NOR-gates $O_1$ and $O_2$ in accordance with the inverted function associated with the table of FIG. 19b the two bits $b_1$ and $b_2$ associated with the group $G_1$ can be obtained.

One period $\frac{1}{2}\tau_0$ later, the signals coming from the positions 2, 4, 6 and 8 of the symbol are present on the points 148, 150, 152 and 154 and the bits $b_3$ and $b_4$ are obtained in a similar manner.

The demodulation method described with reference to FIG. 21a can be realized by means of the circuit shown in FIG. 21b, which corresponds to what has been described with reference to FIG. 21a but with some simplifications. Since only one position of each group is occupied, the detection of one of said positions is superfluous, since, as the remaining three positions are not occupied, said fourth position must be occupied. The group of comparators $V_{10}$, $V_{11}$ and $V_{12}$ as well as the associated AND-gate $A_4$ has therefore been omitted from the circuit shown in FIG. 21b. In addition, it holds that the comparators $V_4$, $V_7$ and $V_8$ carry out the comparison which is inverse to the comparison carried out by said comparators $V_1$, $V_2$ and $V_5$, respectively, so that they may be omitted if the outputs of comparators $V_1$, $V_2$ and $V_5$, respectively are not only connected to the inputs of AND-gates $A_1$ and $A_2$ but also to inverting inputs of AND-gates $A_2$ and $A_3$. The demodulator of FIG. 21b has been constructed thus. The outputs 155, 156 and 157, respectively of AND-gates $A_1$, $A_2$ and $A_3$, respectively are "high" when position 1, 3 and 5, respectively, —and a time $\frac{1}{2}\tau_0$ later position 2, 4 and 6, respectively—are occupied and all three oututs are "low" when position 7—and a time $\frac{1}{2}\tau_0$ later position 8—is occupied. The NOR-gates $O_1$ and $O_2$ produce the associated bits $b_1$ and $b_2$, followed $\frac{1}{2}\tau_0$ later by the bits $b_3$ and $b_4$.

A shift register may be employed in order to have the bits $b_1$, $b_2$, $b_3$ and $b_4$ available in series. As shown in FIG. 21b buffers 158, 159, 160 and 161 may be employed to have these four bits available in parallel. Buffers 158 and 160 are connected to the output of NOR-gate $O_1$ and buffers 159 and 161 to the output of NOR-gate $O_2$. Via a clock input 166, a clock signal is applied to buffers 158 and 160 at or after the instant at which the signal on position 1 is present on point 154 and they consequently buffer the bits $b_1$ and $b_2$. Buffers 159 and 161 are clocked via input 167 at the instant the signal coming from position 2 is available on point 154, and they consequently buffer the bits $b_3$ and $b_4$. Hence, the four bits $b_1$, $b_2$ $b_3$ and $b_4$ are available in parallel on outputs 162, 163, 164 and 165 of said buffers. Since comparators $V_5$ and $V_1$, respectively, produce the same signal as comparator $V_9$, however, a time $\tau$ and $2\tau$, respectively later, comparators $V_5$ and $V_1$, respectively may if so desired be replaced by delay networks which apply the output signal of comparator $V_9$ delayed by a time $\tau$ and $2\tau$, respectively, to grates $A_2$ and $A_3$ and $A_1$ and $A_2$ respectively. Likewise, comparator $V_2$ produces the same signal as comparator $V_6$, however, delayed by a time $\tau$. Thus, that comparator $V_2$ may also be replaced by a time delay network having time delay $\tau$ which applies the output signal of comparator $V_6$ delayed a time $\tau$ to gates $A_1$ and $A_3$.

For the modulation and demodulation of signals several clock signals are required. These clock signals can be recovered by a clock signal transmitted with the signals, such as the prerecorded clock signal in accordance with said prior patent application, or in a different manner. Thus, the clock signals $c_1$ and $c_4$ are, for example, required for the modulator of FIG. 20a. In addition, clock signals are required which occur synchronously with the sequence of symbols, for example the signals $c_2$ and $c_3$ (FIG. 20b) as well as the signals which must be applied to the buffers 158 to 161, inclusive in the demodulator of FIG. 21b. A symbol synchronizing signal is required to guarantee said synchronism.

With the optical record carrier for data storage the track circumference is subdivided into sectors in which information, for example coded as described above, may be inscribed. These sectors are separated by synchronization and address areas in which information is present which contains data concerning the track and sector numbers as well as symbol synchronizing information. Said symbol synchronization may consist of a number of symbols which comprise certain information. In order to keep the chance that identical symbols sequences occur in the information to be inscribed acceptably low, a long sequence of synchronization symbols must often be employed. With the described coding the required sequence of synchronization symbols may be considerably shortened by coding at least two of those symbols differently. For the code in accordance with the embodiment two positions are at all times occupied for each symbol (M=2, k=1, s=I =4). Two symbols each having three positions occupied may then be opted for. In order to still preserve the advantages of the described coding, said different symbols must also satisfy the definitions given with reference to FIG. 14. In the embodiment two symbols, each having 8 possible positions which together form a symbol having the parameters M=2, k=3 and s=I=8 are opted for: so a symbol having a length of $8\tau 0$ with 16 possible positions, three even and three odd positions of which are occupied.

Such a synchronization symbol sequence can be detected by means of a shift register and a logic gate. FIG. 22 shows such an embodiment. This symbol synchronizing signal generator comprises a shift register 168 having 48 positions, a clock signal input 170 and a signal input 169. A number of positions in that shift register, namely the positions 1, 2, 9, 10, 16, 17, 23, 24, 29, 32, 35, 38, 41 and 46 are connected to inputs of an AND-gate 171 having output 172. A pulse appears on output 172 when via input 169 a sequence of symbols have been entered, the occupied positions of which coincide with those positions in the shift register which are connected to the ABD-gate. Such a fitting sequence of in this case 6 symbols $S_1$ to $S_6$ is shown in FIG. 22 above the shift register 168. The symbols $S_2$ and $S_3$ of these symbols are coded differently and together satisfy the said definition M=2, k=3, s=I=8.

The input signal on input 108 is obtained by reading the optical disc. The read signal itself is not yet suitable for logic processing and must therefore be processed. This may be done by means of the demodulator shown in FIG. 21b. When, for example, the signal coming from an occupied position is present at the demodulator of FIG. 21b on point 152 the output of AND-gate $A_2$ is high. As the read signal shifts continuously via input 148 along point 152 the output of AND-gate $A_2$ represents all occupied positions of the signal, one after the other, with output signal "high". The output signal of AND-gate $A_2$ at an output 173 is therefore suitable for use as the input signal for shift register 168, which also applies to the two other AND-gates.

By way of illustration, FIG. 23 shows the relationship between the modulator of FIG. 20a, the demodulator of FIG. 21b and the symbol synchronizing signal generator of FIG. 22 in an optical information recording system. The system includes a disc-shaped optical record carrier 1, which is driven by a drive mechanism 21, a laser 15 which directs a light beam to the record carrier 1 via a semi-transparent mirror 17 and an optical system 18 to write and/or read information and having a detector 27 which detects via mirror 17 the light beam reflected from the record carrier.

The output 138 of the demodulator of FIG. 20a is coupled to the laser 15 for modulating the laser beam and detector 27 is coupled to the input 148 of the demodulator of FIG. 21. If a clock signal which is cotransmitted in a zero point ($w_0 = 2\pi/\tau_0$ in the embodiment) of the signal spectrum is employed, then this clock signal may be extracted from the detected signal by means of band-pass filter 80. The signal from filter 80 synchronizes—for example employing the known phase-locked loop technique—a synchronizing signal generator 81 which may, for example, comprise a ring counter. This generator 81 applies the required clock signals to the inputs 106, 107, 108, 109, 166, 167 and 170 of the modulator, the demodulator and the symbol synchronizing signal generator. The symbol synchronizing signal generator receives a signal from output 173 of the demodulator and applies a symbol synchronizing signal to the synchronizing signal generator 81, for example to the resetting input of the ring counter comprised therein.

What is claimed is:

1. A system for transmission of digital information comprising means for receiving digital information in groups of input words, encoding means for converting the inputs words into code words representing the input words, each code word corresponding to an input word, means for applying the code words to a transfer medium, means for receiving the code words from the transfer medium and means for applying the received code words to a decoding means for converting the code words into digital information, wherein each code word has a time duration equal to $s\tau_0$, where s is an integer and $\tau_0$ is a given time interval, and each code word consists of M subgroups, $G_m$, of I signal positions, $t_{mi}$, spaced by equal time intervals, $\tau$, where M and I are integers, m is the subgroup, $G_m$, from 1 to M inclusive, and i is the signal position number within each subgroup $G_m$ from 1 to I inclusive, a number k of the signal positions $t_{mi}$ in each subgroup $G_m$ being always occupied by a signal which is distinguishable from the signals in the unoccupied positions, wherein k is an integer smaller than I ($1 \leq k \leq I-1$), the first signal positions $t_{mi}$ of the subgroups $G_m$ each being located at different time intervals, $\epsilon_m$, from the beginning of the code word, where $0 \leq \epsilon_m \leq \tau$, with the restriction $M \leq 2$ and $$\sum_{m=1}^{M} \epsilon_m + (I-1)\tau \leq s\tau_0$$

and the group of code words for which it holds that: $M=2$, $I=s=2$, $k=1$, $\tau=\tau_0$ and $\epsilon_2=\epsilon_1+\frac{1}{2}\tau$ excepted.

2. A system as claimed in claim 1 wherein it holds that $I=s$ and $\tau=\tau_0$.

3. A system as claimed in claim 1 or 2, wherein the initial positions $t_{m1}$ are located at time intervals $\epsilon_m=\epsilon_1+m-1/M \ \tau$ from the beginning of the code word.

4. A system as claimed in claim 3 including means for generating a pilot signal having an angular frequency $\omega_0=2\pi/\tau$ which is applied to said medium by said applying means, and wherein said decoding means includes means for recovering said pilot signal from said medium, said recovered pilot signal serving as a clock signal.

5. A system as claimed in claim 3 wherein it holds for the group of code words that: $I=s=4$, $M=2$, $\tau=\tau_0$, $k=1$ and $\epsilon_2=\epsilon_1+\frac{1}{2}\tau_0$.

6. A system as claimed in claim 5 wherein said input words consist of four bits and said encoding means includes means for dividing each input word into two groups of two bits, means for applying each of said two groups to a one-out-of-four decoding circuit, and means for alternately combining the four outputs of each of the two decoding circuits to supply the code words associated with the input word.

7. A system according to claim 6 including a shift register and means for alternately connecting the outputs of the two decoding circuits to parallel inputs of said shift register to form the code word from both subgroups.

8. A system as claimed in claims 1 or 2 wherein the initial positions $t_{m1}$ are located at time intervals $\epsilon_m=\epsilon_1+M-1/M+\delta \ \tau$ from the beginning of the code word, where $\delta$ is the deviation of initial positions $t_{m1}$ from locations the initial positions would occupy if the initial positions $t_{m1}$ were spaced apart by time intervals $\tau/M$, and including means for recovering a clock signal from the coded signal, said recovering means comprising a bandpass filter tuned to an angular frequency $\omega_0=2\pi/\tau_0$.

9. A system as claimed in claim 1 including means for dividing the input words into M groups of bits, and wherein said encoding means includes a k-out-of-I coding circuit for forming each group of said bits into a subgroup $G_m$ and means for combining said subgroups by superpositioning to form said code word.

10. A system as claimed in claim 1 wherein said decoding means includes an array of $I-1$ delay networks connected in series and such having a time delay $\tau$, and a comparison circuit coupled to the inputs and outputs of said delay networks for sequentially detecting in time intervals $\epsilon_m$ each occupied position $t_{mi}$.

11. A system as claimed in claim 10 including means for forming bits of an output word in dependence on said detection of occupied positions $t_{mi}$ of subgroups $G_m$ and means coupled to said bit forming means for releasing said bits in series and/or parallel.

12. A system as claimed in claim 1, wherein the medium is a record carrier comprising information areas in which information can be recorded or has been recorded in the form of code words, the information areas being separated by address and synchronization areas in which address and synchronization information has been prerecorded in the form of said code words.

13. A system as claimed in claim 12, wherein the address and synchronization information is recorded in the form of words having predetermined values of the parameters I, s, M, $\tau$, $\tau_0$, k and $\epsilon_m$ and wherein at least two code words having said predetermined values have a different number of occupied positions such that said at least two code words together form a code word having a value of at least one of the parameters I, s, or K which is different from said predetermined values.

14. A system as claimed in claim 13, wherein the address and synchronization information is recorded in the form of code words of a group having parameters $I=s=4$, $M=2$, $\tau=\tau_0$, $k=1$ and $\epsilon_2=\epsilon_1+\frac{1}{2}\tau_0$ and in at least two code words of the synchronization information, an additional position is occupied such that the two code words together form a code word from a group having parameters $I=s=8$, $M=2$, $\tau=\tau_0$, $k=3$ and $\epsilon_2=\epsilon_1+\frac{1}{2}\tau_0$.

15. A coding arrangement for encoding digital information grouped in input words each comprised of a plurality of bits, the coding arrangement comprising means for receiving said input words, a code word generator for generating code words each corresponding to an input word, said code words belonging to a group of code words and each having a time duration equal to s $\tau_0$, where s is an integer and $\tau_0$ is a given time interval, each code word generated by said generating means being composed of M subgroups $G_m$ of I signal positions $t_{mi}$ which are spaced by equal time intervals $\tau$, where M and I are integers, m is the subgroup $G_m$, from 1 to M, inclusive, and i is the signal position number within each subgroup $G_m$ from 1 to I, inclusive, a number k of the signal positions $t_{mi}$ in each subgroup $G_m$ being always occupied by a signal which is distinguishable from the signal in unoccupied positions, wherein k is an integer smaller than I ($1<k<i-1$), the first positions $t_{m1}$ of the subgroups $G_m$ being located at mutually different time intervals $\epsilon_m$ from the beginning of the code words where $0<\epsilon_m \leq \tau$, with the restrictions $M \geq 2$ and $$\sum_{m=1}^{M} \epsilon_m + (I-1)\tau \leq s\tau_0$$

and the group of code words for which it holds that $M=2$, $I=s=2$, $k=1$, $\tau=\tau_0$ and $\epsilon_2=\epsilon_1+\frac{1}{2}\tau$, excepted.

16. A coding arrangement as claimed in claim 15, wherein it holds that: $I=s$ and $\tau=\tau_0$.

17. A coding arrangement as claimed in claim 15 or 16, wherein the initial positions $t_{m1}$ are located at time intervals $\epsilon_m = \epsilon_1 + m - 1/M + \delta \tau$ from the beginning of the code word, where $\delta$ is the deviation of initial positions $t_{m1}$ from locations they would have if the initial positions $t_{m1}$ were spaced apart by time intervals $\tau/M$.

18. A coding arrangement as claimed in claim 15 or 16, wherein the initial positions $t_{m1}$ are located at time intervals $\epsilon_m = \epsilon_1 + m - 1/M \tau$ from the beginning of the code word.

19. A coding arrangement as claimed in claim 17, wherein it holds that: $I=s=4$, $M=2$, $\tau=\tau_0$, $k=1$ and $\epsilon_2 = \epsilon_1 + \frac{1}{2}\tau_0$.

20. A coding arrangement as claimed in claim 15 wherein the input words are comprised of n.M bits, where n is an integer equal to or greater than one, and including means for dividing those input words into M groups of n bits, M decoding circuits for generating one subgroup $G_m$ for each group of n bits and means for superpositioning the M subgroups $G_m$.

21. A coding arrangement as claimed in claim 20, wherein $n=2$, $M=2$ and $n=1$, the decoding circuits are one-out-of-four decoders each having four outputs of which at all times one output is at a different signal level than the other three outputs depending on which one of the four possible combinations of two bits is present on the input of that decoder, and the outputs of both one-out-of-four decoders are alternately combined for forming the code word associated with the input word.

22. A coding arrangement as claimed in claim 21, wherein the outputs of both one-out-of-four decoders are alternately connected to parallel inputs of a shift register to thus form the code word from both subgroups.

23. A decoding arrangement for use in a system for transmission of digital information wherein the decoding arrangement has an input for receiving code words and an output for supplying digital information by decoding those code words and the decoding arrangement is arranged for decoding code words belonging to a group of codes words each having a length of time equal to $s\tau_0$, where s is an integer and $\tau_0$ is a given time interval, each code word consisting of M subgroups $G_m$ of I signal positions $t_{mi}$ which are spaced by equal time intervals $\tau$, where m is a number from 1 to M, inclusive, and i is the signal position number within each subgroup $G_m$ from 1 to I, inclusive a number k of signal positions $t_{mi}$ in each subgroup $G_m$ being always occupied by a signal which is distinguishable from the signal in unoccupied positions, whereing k is an integer smaller than I ($1<k<I-1$), the first signal positions $t_{m1}$ of the subgroups $G_m$ each being located at mutually different time intervals $\epsilon_m$ from the beginning of the code word, where $0 \leq \epsilon_m \leq \tau$, with the restrictions $M \geq 2$ and $$\sum_{m=1}^{M} \epsilon_m + (I-1)\tau \leq s\tau_0$$

and the group of code words for which it holds that: $M=2$, $I=s=2$, $k=1$, $\tau=\tau_0$ and $\epsilon_2=\epsilon_1+\frac{1}{2}\tau$, excepted.

24. A decoding arrangement as claimed in claim 23, wherein the decoding arrangement comprises an array of $I-1$ delay networks connected in series and each having a time delay $\tau$ whose inputs and outputs lead to a comparison circuit to thus detect sequentially for time intervals $\epsilon_m$ the occupied positions $t_{mi}$ of each subgroup $G_m$.

25. A decoder arrangement as claimed in claim 24 wherein, an input of each delay network with an input of each of the other delay networks forms a first series of input pairs and an input of each delay network with an output of the last delay network of said series connected networks form a second series of input/output pairs, and wherein the comparison circuit comprises a plurality of comparators each having an inverting and a non-inverting input, said inputs of an associated one of said comparators being coupled to each of said pairs of said first and second series, first logic gates for comparing output signals of the comparators, the outputs of said first logic gates each being associated with an occupied position $t_{mi}$ of a subgroup $G_m$ so that the outputs of those logic gates produce sequentially the subgroups $G_m$, and second logic gates for generating the digital information associated with the code words.

26. A decoding circuit as claimed in claim 25 including third logic gates connected to the output of one of the first logic gates for generating a word synchronizing signal from a sequence of predetermined code words.

27. A decoding arrangement as claimed in claim 23, 24 or 25, including a bandpass filter which is turned to an angular frequency $w_0 = 2\pi/\tau$ for extracting a clock signal from the signal formed by the code words.

28. A decoding circuit as claimed in claims 23, 24 or 25 including third logic gates for generating a word synchronizing signal from a sequence of predetermined code words.

29. A record carrier comprising information areas where information can be recorded or has been recorded in the form of code words, the information areas being separated by address and synchronization areas in which address and synchronization information has been prerecorded in the form of code words which belong to a group of code words each having a time duration equal to $s\tau_0$, where s is an integer and $\tau_0$ is a given time interval, and each code word consisting of M subgroups, $G_m$, of I signal positions, $t_{mi}$, which are spaced by equal time intervals, $\tau$, where M and I are integers, M is the subgroup $G_m$, from 1 to M inclusive, and i is the signal position number within each subgroup $G_m$ from 1 to I, inclusive, a number k of the signal positions $t_{mi}$ being always occupied in each subgroup $G_m$ by a signal which is distinguishable from the signal in unoccupied positions, wherein k is an integer smaller than I ($1<k<I-1$), the first positions $t_{m1}$ of the subgroups $G_m$ being each located at mutually different time intervals $\epsilon_m$ from the beginning of the code word, where $0 \leq \epsilon_m \leq \tau$, with the restrictions $M \geq 2$ and $$\sum_{m=1}^{M} \epsilon_m + (I-1)\tau \leq s\tau_0$$

and the group of code words for which it holds that: $M=2$, $I=s=2$, $k-1$, $\tau=\tau_0$ and $\epsilon_2=\epsilon_1+\frac{1}{2}\tau$, excepted.

30. A record carrier as claimed in claim 29, wherein it holds that $I=s$ and $\tau=\tau_0$.

31. A record carrier as claimed in claim 30 or 33, wherein it holds for the group of code words that $I=s=4$, $M=2$, $\tau=\tau_0$, $k=1$ and $\epsilon_2=\epsilon_1+\frac{1}{2}\tau_0$.

32. A record carrier as claimed in claim 30 or 31, wherein the initial positions $t_{m1}$ are located equidistantly at time intervals $\epsilon_m=\epsilon_1+m-1/M+\delta\tau$ from the beginning of each code word, where $\delta$ is the deviation of initial positions $t_{m1}$ from locations the initial positions would occupy if the initial positions $t_{m1}$ were spaced apart by time intervals $\tau/M$.

33. A record carrier as claimed in claim 29 or 30, wherein the initial positions $t_{m1}$ are located at time intervals $\epsilon_m=\epsilon_1+m-1/M\ \tau$ from the beginning of the code word.

34. A record carrier as claimed in claim 33, wherein a pilot signal having angular frequency $w_0=2\pi/\tau$ is added to the code words.

35. A record carrier as claimed in claim 30, wherein address and synchronization information is recorded in the form of code words having predetermined values for the parameters I, s, M, $\tau$, $\tau_0$, k and $\epsilon_m$ and wherein at least two code words having said predetermined values have a different number of occupied positions such that said at least two code words together form a code word having a value of at least one of the parameters I, s, or k which is different from said predetermined values.

36. A record carrier as claimed in claim 35, wherein the address and synchronization information is recorded in the form of code words, from a group having parameters $I=s=4$, $M=2$, $\tau=\tau_0$, $k=1$ and $\epsilon_2=\epsilon_1+\frac{1}{2}\tau_0$ and in at least two code words of the synchronization information an additional position is occupied such that the two code words together form a code word from a group having parameters $I=s=8$, $M=2$, $\tau=\tau_0$, $k=3$ and $\epsilon_2=\epsilon_1+\frac{1}{2}\tau_0$.

* * * * *

UNITED STATES PATENT AND TRADEMARK OFFICE
CERTIFICATE OF CORRECTION

PATENT NO. : 4,464,714

DATED : August 7, 1984

INVENTOR(S) : ARIE HUIJSER ETAL

It is certified that error appears in the above-identified patent and that said Letters Patent is hereby corrected as shown below:

In the Claims:

Claim 1, line 24, change "$M \leqq 2$" to --$M \geqq 2$--

Claim 10, line 3, "such" should be --each--

Claim 23, line 21, change "$M \leqq 2$" to --$M \geqq 2$--

Signed and Sealed this

Nineteenth Day of March 1985

[SEAL]

Attest:

DONALD J. QUIGG

Attesting Officer

Acting Commissioner of Patents and Trademarks